US011949948B2

(12) United States Patent
Candelore

(10) Patent No.: US 11,949,948 B2
(45) Date of Patent: Apr. 2, 2024

(54) PLAYBACK CONTROL BASED ON IMAGE CAPTURE

(71) Applicant: SONY GROUP CORPORATION, Tokyo (JP)

(72) Inventor: Brant Candelore, San Diego, CA (US)

(73) Assignee: SONY GROUP CORPORATION, Tokyo (JP)

( * ) Notice: Subject to any disclaimer, the term of this patent is extended or adjusted under 35 U.S.C. 154(b) by 24 days.

(21) Appl. No.: 17/317,079

(22) Filed: May 11, 2021

(65) Prior Publication Data
US 2022/0368984 A1 Nov. 17, 2022

(51) Int. Cl.
*H04N 21/442* (2011.01)
*H04N 21/422* (2011.01)
*H04N 21/4223* (2011.01)
*H04N 21/472* (2011.01)
*H04N 21/6587* (2011.01)

(52) U.S. Cl.
CPC . *H04N 21/44218* (2013.01); *H04N 21/42203* (2013.01); *H04N 21/4223* (2013.01); *H04N 21/47217* (2013.01); *H04N 21/6587* (2013.01)

(58) Field of Classification Search
CPC ....... H04N 21/44218; H04N 21/42203; H04N 21/4223; H04N 21/47217; H04N 21/6587
See application file for complete search history.

(56) References Cited

U.S. PATENT DOCUMENTS

| 6,678,362 | B2* | 1/2004 | Hong | H04M 1/82 379/142.16 |
|---|---|---|---|---|
| 6,754,373 | B1 | 6/2004 | De Cuetos | |
| 10,171,877 | B1* | 1/2019 | Shah | H04N 21/812 |
| 2003/0154084 | A1 | 8/2003 | Li | |
| 2007/0061851 | A1* | 3/2007 | Deshpande | G06V 40/167 725/102 |
| 2011/0072452 | A1 | 3/2011 | Shimy et al. | |
| 2011/0164143 | A1* | 7/2011 | Shintani | H04N 21/4223 348/222.1 |
| 2011/0274405 | A1 | 11/2011 | Godar | |
| 2012/0224043 | A1* | 9/2012 | Tsurumi | H04N 21/4396 348/78 |
| 2014/0282644 | A1* | 9/2014 | Terrazas | G06V 40/10 725/12 |

(Continued)

FOREIGN PATENT DOCUMENTS

| CN | 111147788 A | 5/2020 |
|---|---|---|
| EP | 1300013 B1 | 9/2006 |

(Continued)

*Primary Examiner* — Joshua D Taylor
(74) *Attorney, Agent, or Firm* — CHIP LAW GROUP

(57) ABSTRACT

An electronic device is provided for control of playback based on image capture. The electronic device includes circuitry. The circuitry is communicatively coupled to an imaging apparatus and a rendering device that plays content. The circuitry acquires, from the imaging apparatus, one or more images of a user of the electronic device and a physical space associated with the user. The circuitry detects a lip movement of the user based on the acquired one or more images. The circuitry determines whether the user is in a conversation based on the detected lip movement of the user. The circuitry controls playback of the content on the rendering device based on the determination.

19 Claims, 9 Drawing Sheets

(56) References Cited

U.S. PATENT DOCUMENTS

| | | | |
|---|---|---|---|
| 2015/0022683 A1* | 1/2015 | Wang | H04N 21/41407 348/222.1 |
| 2015/0271558 A1* | 9/2015 | Pomeroy | H04N 21/42201 725/13 |
| 2015/0277560 A1* | 10/2015 | Beaty | G06F 3/015 345/156 |
| 2016/0092734 A1* | 3/2016 | Loce | G06V 40/23 382/103 |
| 2016/0100379 A1* | 4/2016 | Nguyen | H04W 68/02 455/458 |
| 2018/0295420 A1* | 10/2018 | Rumreich | H04N 21/4532 |
| 2019/0182072 A1* | 6/2019 | Roe | H04N 21/44218 |
| 2020/0296463 A1* | 9/2020 | Martinez | G06Q 30/0246 |
| 2020/0413136 A1* | 12/2020 | Kunduru | H04N 21/44204 |

FOREIGN PATENT DOCUMENTS

| | | | |
|---|---|---|---|
| EP | 3515052 A1 | 7/2019 | |
| WO | WO-2015160561 A1 | 10/2015 | |
| WO | 2018/176450 A1 | 10/2018 | |
| WO | 2020/088158 A1 | 5/2020 | |

\* cited by examiner

PLAYBACK CONTROL BASED ON IMAGE CAPTURE

CROSS-REFERENCE TO RELATED APPLICATIONS/INCORPORATION BY REFERENCE

None.

FIELD

Various embodiments of the disclosure relate to control of playback based on image capture. More specifically, various embodiments of the disclosure relate to an electronic device and method for control of playback based on image capture.

BACKGROUND

Recent advancements in the field of display devices (such as televisions) have led to the development of various techniques to provide an improved viewing experience for a user (such as a viewer), and improved user interfaces for control of such display devices. In certain scenarios, a display device may be a smart television or may be connected to a digital media player (such as a digital video recorder or a digital set top box), which may allow control of playback (such as play and pause) of content by a remote control. For instance, the user may wish to take a bathroom break, answer a phone call, answer the front door, or grab a refreshment from the kitchen during playback. In such a scenario, the user may pause the playback of the content, and resume the playback without missing any scenes of the content. However, in order to pause the playback, the user may need to locate the remote control and then press the "pause" button on the remote control. When there are multiple viewers who may take breaks during the playback, the user may need to repeat this process every time, which may become tedious and inconvenient. In some cases, the remote control may have a built-in microphone and the user may control the playback using a voice command. However, even in such cases, the user may still need to locate the remote control and then speak the command. Further, the user may abruptly engage in a conversation with another user (such as a family member) during the playback, or may respond to a call or text message. In such a case, the user may miss one or more scenes of the content, and may need to rewind the content after the conversation or after responding to the call or text message, which may affect viewing experience.

Limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and a method for control of playback based on image capture is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
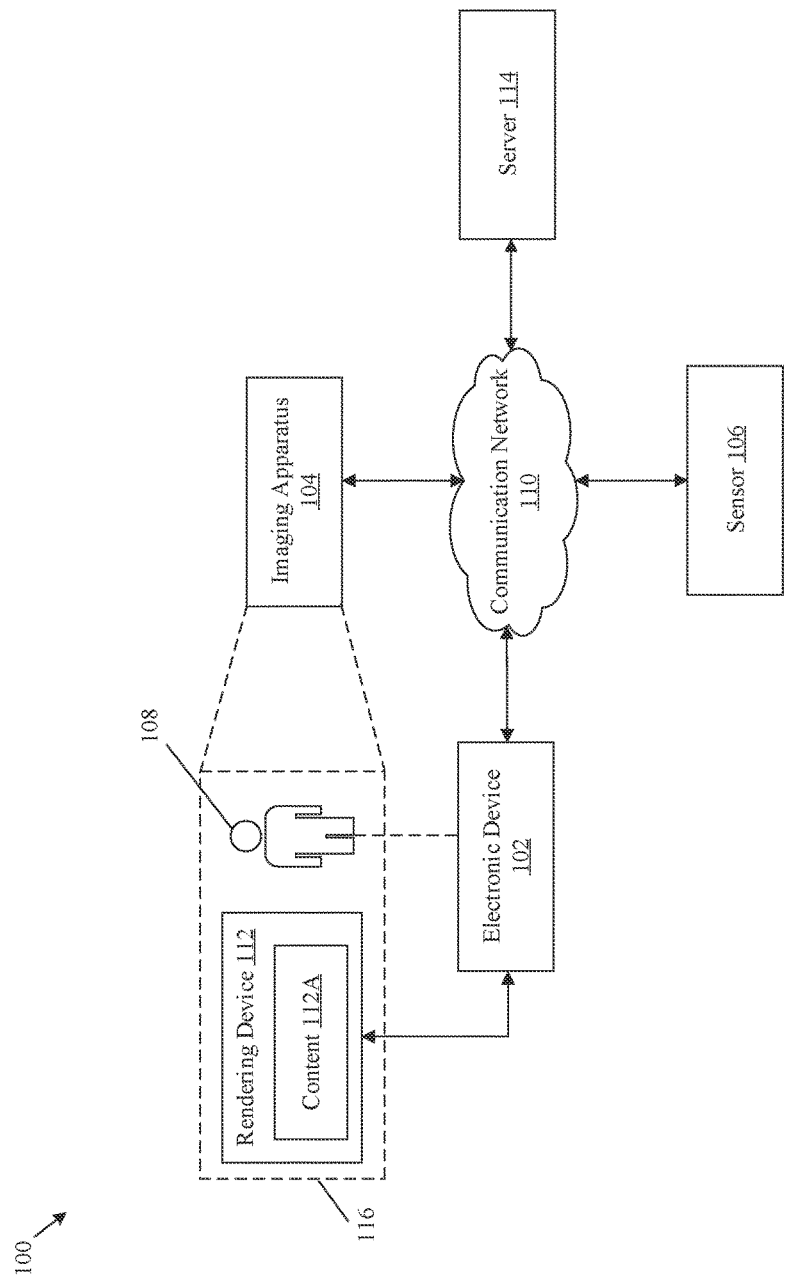
FIG. 1 is a block diagram that illustrates an exemplary network environment for control of playback, in accordance with an embodiment of the disclosure.

The following described implementations may be found in the disclosed electronic device and method for control of playback of content (such as media content). Exemplary aspects of the disclosure provide an electronic device (such as a smart television or a digital media player) communicatively coupled to an imaging apparatus and a rendering device (such as a display screen, a speaker, or a display device with built-in speakers) that plays content. The electronic device may acquire, from the imaging apparatus, one or more images of a first user (such as a viewer of the display screen) of the electronic device and a physical space (such as a living room or a media room where the rendering device is disposed) associated with the first user. The electronic device may detect a lip movement of the first user based on the acquired one or more images. The electronic device may determine whether the first user is in a conversation based on the detected lip movement of the first user. The electronic device may control playback (such as pause playback) of the content on the rendering device based on the determination.

In an embodiment, the electronic device may detect a posture of the first user based on the acquired one or more images. The electronic device may determine that the first user is in the conversation with a second user in the physical space, based on the detected posture (such as head turn, change in gaze, nodding gesture, hand gesture, etc.) of the first user. In another embodiment, the electronic device may determine that the first user is in the conversation on a user device, based on the detected posture (such as holding up the user device or gazing at the user device) of the first user. The electronic device may detect the posture in addition to the lip movement to reduce false positives related to the detection of the conversation. In another embodiment, the electronic device may determine an end of the conversation of the first user based on the lip movement of the first user and/or the posture of the first user. The electronic device may resume the playback of the content on the rendering device based on the determined end of the conversation of the first user. The electronic device may provide a virtual playback assistant that automatically pauses the playback of the content (such as media content) on the rendering device based on the conversation of the first user. The electronic device may improve playback control by automatic resume of the playback of the content after the conversation has ended.

The electronic device may determine that a movement of the first user in the physical space is larger than a threshold. The electronic device may pause the playback of the content on the rendering device based on the determination that the movement of the first user is larger than the threshold. The electronic device may determine an exit of the first user from the physical space (such as a living room or a media room where the rendering device is disposed). The electronic device may pause the playback of the content on the rendering device based on the determined exit of the first user from the physical space. Thus, the electronic device may automatically pause the playback of the content (such as media content) on the rendering device based the exit of the first user from the physical space (such as the living room or media room), for example, to take a bathroom break, answer a phone call, answer the front door, or grab a refreshment from the kitchen. The electronic device may thereby improve playback control by automatic pause and resume of the playback in case the first user exits the physical space, for example, to take a break during playback of the content.

The electronic device may detect a second user in the physical space based on the acquired one or more images of the physical space. The electronic device may control the playback of the content on the rendering device based on the detected second user after a specific time from the detection of the second user. The electronic device may improve viewing experience by automatic pause of the playback in case the first user is interrupted by the second user who may enter the physical space. The electronic device may further improve playback control by automatic pause and resume of the playback in case the second user (such as another viewer) may exit the physical space (such as the living room or media room).

The electronic device may receive, from a user device (such as a mobile phone) associated with the first user, a trigger signal based on an incoming notification at the user device. The electronic device may detect, in response to the trigger signal, a posture of the first user based on the acquired one or more images. The detected posture may indicate that the user device is held close to a head of the first user, or that the user device is held in a hand of the first user. The electronic device may pause the playback of the content on the rendering device based on the detected posture. For example, the incoming notification may correspond to at least one of an incoming call, an incoming text message, or an incoming email at the user device. The electronic device may thereby provide a virtual playback assistant that improves playback control by automatic pause of the playback in case the first user may view or respond to the incoming call or incoming text message, such that the playback may be resumed after responding to the incoming call or incoming text message without missing one or more scenes of the content.

FIG. 1 is a block diagram that illustrates an exemplary network environment for control of playback, in accordance with an embodiment of the disclosure. With reference to FIG. 1, there is shown a network environment 100. In the network environment 100, there is shown an electronic device 102, an imaging apparatus 104, a sensor 106, a rendering device 112, and a server 114. The electronic device 102, the imaging apparatus 104, the sensor 106, and the server 114 may be communicatively coupled to the electronic device 102 through a communication network 110. The electronic device 102 may be coupled to a rendering device 112 configured playback content (such as media content). The electronic device 102 may be associated with the first user 108. The imaging apparatus 104 may capture one or more images of a physical space 116 associated with the first user 108.

The electronic device 102 may comprise suitable logic, circuitry, and interfaces that may be configured to control the playback of the content 112A on the rendering device 112. For example, the electronic device 102 may acquire, from the imaging apparatus 104, one or more images of the first user 108 of the electronic device 102 and the physical space 116 of the first user 108. The electronic device 102 may detect a lip movement of the first user 108 and a posture of the first user 108 based on the acquired one or more images. The electronic device 102 may determine whether the first user 108 is in a conversation based on the detected lip movement and/or the detected posture of the first user 108. Based on the determination, the electronic device 102 may control playback (such as pause and resume play) of the content on the rendering device 112. Details of the control of the playback are further described, for example, in FIGS. 3-8. Examples of the electronic device 102 may include, but are not limited to, a television (TV), such as a smart television (TV), a digital media player, a set-top box (STB), a streaming media player, a digital video recorder (DVR), a personal video recorder (PVR), a three-dimensional (3D) display device, a free viewpoint TV, a computing device, an e-paper based display device, a home theatre system, a video conferencing display device, a gaming console, a media processing system, a new form factor (NFF) television, or other consumer electronic (CE) device capable of playback control of the content 112A. Examples of the content 112A that may be played by the electronic device 102 may include, but are not limited to, streaming content, stored content, over-the-air content, video content, audio content, audio-video content, gaming content, three-dimensional (3D) content, 360-degree video content, and so on. The format of the content 112A may include, but is not limited to, moving picture experts group (MPEG) format, advanced video coding (AVC), high-efficiency video coding (HEVC), flash video (FLV), MPEG-dynamic adaptive streaming over HTTP (MPEG-DASH), and other audio and video coding formats.

The imaging apparatus 104 may include suitable logic, circuitry, and/or interfaces that may be configured to capture one or more images of the first user 108 and the physical space 116. For example, the one or more images may be still images or moving images. The imaging apparatus 104 may include a single camera with movable angle of view or multiple cameras having different angles of view. In an embodiment, the imaging apparatus 104 may be separate from the electronic device 102, and may be coupled to the electronic device 102 via the communication network 110. In another embodiment, the imaging apparatus 104 may be integrated with the electronic device 102. The imaging apparatus 104 may include one or more parameters, such as, resolution, field of view, angle of view, frame rate (for example, frames per second), magnification, and so on. The parameters of the imaging apparatus 104 may be controlled by the electronic device 102 via the communication network 110. For example, the electronic device 102 may control panning of the imaging apparatus 104 to change the angle of view of the imaging apparatus 104 to cover different regions of the physical space 116. The electronic device 102 may change the angle of view of the imaging apparatus 104 to track a movement of the first user 108 in the physical space 116. In an embodiment, the angle of view or the field of view of the imaging apparatus 104 may be restricted to a space from which the rendering device 112 (such as a display screen) may be viewable, such that the privacy of the first user 108 at other locations (such as adjacent rooms) may be protected. The imaging apparatus 104 may be configured to transmit the captured one or more images of the first user 108 and/or the physical space 116 to the electronic device 102 via the communication network 110. In one or more embodiments, the imaging apparatus 104 may capture and transmit a plurality of frames of video of the first user 108 and/or the physical space 116 to the electronic device 102. Based on the captured images from the imaging apparatus 104, the electronic device 102 may detect lip movement of the first user 108, a posture of the first user 108, an entry of the first user 108 into the physical space 116, an exit of the first user 108 from the physical space 116, an entry of a second user into the physical space 116, an exit of the second user from the physical space 116, a lip movement and posture of the second user, and so on. Examples of the imaging apparatus 104 may include, but are not limited to, an image sensor, a wide-angle camera, an action camera, an event camera, a closed-circuit television (CCTV) camera, a surveillance camera, a camcorder, a digital camera, camera phones, a time-of-flight camera (ToF camera), a night-vision camera, a 360-degree camera, and/or other image capture devices.

The sensor 106 may comprise suitable logic, circuitry, and interfaces that may be configured to detect a motion of the first user 108, an audio from the first user 108, or other parameters related to detection of the first user 108. Examples of the sensor 106 may include, but are not limited to, an image sensor, an audio sensor (such as a microphone), a motion sensor, a gesture sensor, a light detection and ranging (LiDAR) sensor, a location sensor (such as global positioning system sensor), an infrared (IR) sensor, an ambient light sensor (such as a photodetector, a photodiode, or a photoresistor), a load sensor, or a pressure sensor. For example, the sensor 106 may be an IR sensor that may be configured to detect IR radiation emitted by the first user 108 within the physical space 116. The IR sensor may detect change in IR radiation within the physical space 116 when the first user 108 exits or enters the physical space 116. The electronic device 102 may be configured to detect entry of the first user 108 into the physical space 116 or the exit of the first user 108 from the physical space 116 based on the output of the IR sensor. In another example, the sensor 106 may be a load sensor embedded in a seat disposed in the physical space 116. The load sensor may output a signal based on the occupancy of the seat by the first user 108 due to a change in load detected by the load sensor. The electronic device 102 may be configured to detect movement (such as standing up or sitting down) of the first user 108 in the physical space 116 based on the output of the load sensor. In another example, the sensor 106 may be an image sensor that may capture the physical space 116 from an angle of view different from the angle of view of the imaging apparatus 104. In another example, the sensor 106 may be an audio sensor (such as a microphone) that may detect speech of the first user 108, speech of the second user in the physical space 116, audio information (such as crying sounds) associated with an infant, audio information (such as a ringtone or incoming message notification tone) associated with a user device of the first user 108, and so on.

The communication network 110 may include a communication medium through which the electronic device 102 may communicate with the imaging apparatus 104, the sensor 106, and/or the server 114. The communication network 110 may be one of a wired connection or a wireless connection. Examples of the communication network 110 may include, but are not limited to, a Wireless Fidelity (Wi-Fi) network, a Local Area Network (LAN), a Personal Area Network (PAN), a Wireless Personal Area Network (WPAN), a Wireless Local Area Network (WLAN), a Wireless Wide Area Network (WWAN), a cloud network, a Long Term Evolution (LTE) network, a Metropolitan Area Network (MAN), and/or the Internet. Various devices in the network environment 100 may be configured to connect to the communication network 110, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, IEEE 802.16, Long Term Evolution (LTE), light fidelity (Li-Fi), multi-hop communication, wireless access point (AP), device to device communication, cellular communication protocols, and Bluetooth (BT) communication protocols. In an embodiment, based on the communication network 110, the electronic device 102 may acquire one or more images from the imaging apparatus 104 or an output signal from the sensor 106.

The rendering device 112 may comprise suitable logic, circuitry, and interfaces that may be configured to render the content 112A (such as audio content and/or video content) played by the electronic device 102. In an embodiment, the rendering device 112 may be connected to the electronic device 102 (such as a digital media player or a personal video recorder) by a wired connection (such as a high-definition multimedia interface (HDMI) connection) or a wireless connection (such as Wi-Fi). In another embodiment, the rendering device 112 may be integrated with the electronic device 102 (such as a smart television), The rendering device 112 (such as a display screen with integrated audio speaker) may include one or more controllable parameters, such as, brightness, contrast, aspect ratio, color saturation, audio volume, etc. The electronic device 102 may be configured to control the parameters of the rendering device 112 by transmitting one or more signals over the wired connection (such as the HDMI connection). The control of the playback of the content 112A on the rendering device 112 may include, but is not limited to, pause playback of the content 112A, resume playback of the content 112A, rewind of the content 112A, fast forward of the content 112A, and change in speed of the playback of the content 112A. The rendering device 112 may be realized through several display technologies, such as a Liquid Crystal Display (LCD) display, a Light Emitting Diode (LED) display, a plasma display, and an Organic LED (OLED) display technology, and other display technologies. In accordance with an embodiment, the rendering device 112 may correspond to a display screen of a smart-glass device, a see-through display, a projection-based display, an electro-chromic display, and/or a transparent display. In accordance with an embodiment, the content 112A may be media content stored on the electronic device (such as a personal video recorder (PVR)) or streamed from the server 114 (such as a media server) via the communication network 110 (such as the Internet). In another embodiment, the content 112A may be played on a user device (such as a smartphone or a tablet computer), and may be cast on the rendering device 112 using a screen-mirroring technology. In another embodiment, the rendering device 112 may include a display device (such as a television) with built-in speakers. In another embodiment, rendering device 112 may include an audio-only device, such as, a speaker, a soundbar, a smart speaker, and so on.

The server 114 may include suitable logic, circuitry, and interfaces, and/or code that may be configured to store the content 112A (such as media content) for on-demand steaming delivery of the content 112A to the electronic device 102 over the communication network 110. The server 114 may store a user history of viewing pattern associated with the first user 108 based on past viewing history of the first user 108. The server 114 may also store object identification data to recognize one or more objects (such as animate objects). The server 114 may transmit the viewing pattern and the object identification data to the electronic device 102 over the communication network 110. For example, the electronic device 102 may detect a human being (such as the first user 108) in the one or more images captured by the imaging apparatus 104 based on the object identification data. The server 114 may include a database to store the content 112A, and may be associated with a content provider. The server 114 may include one or more processors configured to execute high-computation tasks, such as, pattern matching, content recommendation engine, machine learning, and so on. In an exemplary embodiment, the server 114 may be implemented as a cloud server and may execute operations through web applications, cloud applications, HTTP requests, repository operations, file transfer, and the like. Other example implementations of the server 114 may include, but are not limited to, a database server, a file server, a web server, a media server, an application server, a mainframe server, or a cloud computing server.

The physical space 116 may be a three-dimensional space that may be defined by one or more boundaries. The physical space 116 may a three-dimensional space occupied by the first user 108, and may include a three-dimensional space around the first user 108. For example, the boundaries may include walls and/or a roof of a room that houses the rendering device 112. In another example, the boundaries of the physical space 116 may be defined by the angle of view of the imaging apparatus 104. In an embodiment, the angle of view or the field of view of the imaging apparatus 104 may be restricted to a space from which the rendering device 112 (such as a display screen) may be viewable, such that the privacy of the first user 108 at other locations (such as adjacent rooms) may be protected. The physical space 116 may be an indoor space (such as a room) or an outdoor space. Examples of the physical space 116 may include, but are not limited to, a living room, a media room, an office cabin, a conference room, a meeting room, an auditorium, a classroom, a lobby, a theater, or any enclosure that may house the rendering device 112. In an embodiment, the physical space 116 may also have an access (such as a door or a gate) for the first user 108 to enter or exit the physical space 116.

In operation, the imaging apparatus 104 may be configured to capture one or more images of the first user 108 and the physical space 116 (such as the living room or media room) of the first user 108. In some scenarios, the sensor 106 (motion sensor and/or audio sensor) may be configured to detect motion of the first user 108, audio information of the first user 108, or seat occupancy of the first user 108. The electronic device 102 may be configured to acquire the captured one or more images of the first user 108 and the physical space 116 of the first user. For example, the electronic device 102 may recognize a human form or a facial image from the acquired one or more images based on the object identification data. The electronic device 102 may be configured to detect a lip movement of the first user 108 based on the captured one or more images of the first user 108 and the physical space 116. In an embodiment, the electronic device 102 may be configured to compare the detected lip movement of the first user 108 with predefined lip movements indicative of a conversation. The electronic device 102 may be configured to determine whether the first user 108 is in a conversation based on the detected lip movement of the first user 108. The electronic device 102 may be configured to control playback (such as pause playback) of the content 112A (such as media content) on the rendering device 112 based on the determination. Examples of the playback control may include, but are not limited to, pause of the playback of the content 112A, resume of the playback of the content 112A, stop of the playback of the content 112A, change in speed of the playback of the content 112A, rewind of the content 112A, fast forward of the content 112A, and so on.

In an embodiment, the electronic device 102 may be configured to detect a posture of the first user 108 based on the captured one or more images of the first user 108 and the physical space 116. The electronic device 102 may be configured to compare the detected posture of the first user 108 with predefined postures (such as a nodding gesture, change in gaze towards another user, hand gesture, holding a user device close to the head, etc.) indicative of a conversation. The electronic device 102 may determine that the first user 108 is in the conversation with a second user in the physical space 116, based on the detected posture (such as change in gaze, nodding gesture, hand gesture etc.) of the first user 108. In another embodiment, the electronic device 102 may determine that the first user 108 is in the conversation on a user device (as shown in FIG. 4), based on the detected posture (such as holding the user device close to the head or holding the user device in hand and gazing at the user device) of the first user 108. The electronic device 102 may determine an end of the conversation of the first user 108 based on the lip movement of the first user 108 and/or the posture of the first user 108. The electronic device 102 may resume the playback of the content on the rendering device 112 based on the end of the conversation of the first user 108. The electronic device 102 may thereby improving viewing experience by automatic pause the playback of the content 112A on the rendering device 112 based on the conversation of the first user 108. The electronic device may automatically resume the playback of the content 112A after the conversation has ended. Details of the control of the playback based on the conversation of the first user 108 are described, for example, in FIGS. 3, 4, and 6.

In an embodiment, the electronic device 102 may determine that a movement of the first user 108 in the physical space 116 is larger than a threshold. The electronic device 102 may pause the playback of the content 112A on the rendering device 112 based on the determination that the movement of the first user 108 is larger than the threshold. In another embodiment, the electronic device 102 may determine an exit of the first user 108 from the physical space 116. The electronic device 102 may pause the playback of the content 112A on the rendering device 112 based on the determined exit of the first user 108 from the physical space 116, for example, to take a bathroom break, answer a phone call, answer the front door, or grab a refreshment from the kitchen. The electronic device 102 may thereby improve playback control by automatic pause and resume of the playback in case the first user 108 may take breaks during the playback of the content 112A. Details of the control of the playback based on exit of the first user 108 from the physical space 116 are described, for example, in FIG. 5.

Figure 6:
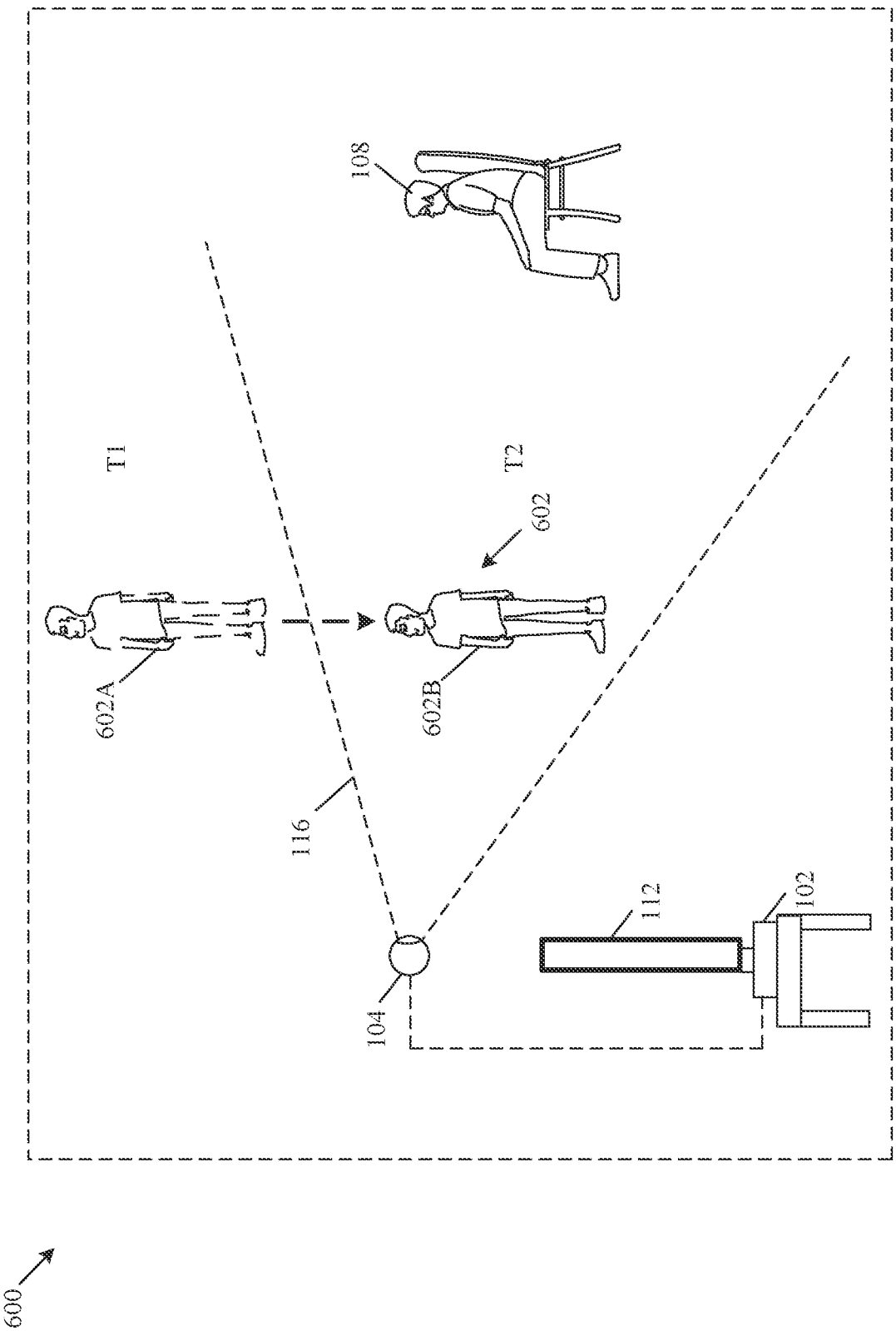
FIG. 6 illustrates an exemplary scenario for control of playback based on detection of a second user in a physical space associated with a first user, in accordance with an embodiment of the disclosure.

In an embodiment, the electronic device 102 may detect a second user (as shown in FIG. 6) in the physical space 116 based on the acquired one or more images of the physical space 116. The electronic device 102 may control the playback of the content 112A on the rendering device 112 based on the detected second user after a specific time from the detection of the second user. The electronic device 102 may improve viewing experience by automatic pause of the playback in case the first user 108 is interrupted by the second user who may enter the physical space 116. The electronic device 102 may further improve playback control by automatic pause and resume of the playback in case the second user (such as another viewer) may exit the physical space 116. Details of the control of the playback based on the detection of the second user are described, for example, in FIGS. 3 and 6.

The electronic device 102 may receive, from a user device (such as a mobile phone) associated with the first user 108, a trigger signal based on an incoming notification at the user device. In response to the trigger signal, the electronic device 102 may detect the posture of the first user 108 based on the acquired one or more images. The detected posture may indicate that the user device is held close to a head of the first user, or that the user device is held in a hand of the first user. The electronic device 102 may pause the playback of the content 112A on the rendering device 112 based on the detected posture. For example, the incoming notification may correspond to at least one of an incoming call, an incoming text message, or an incoming email at the user device. The electronic device 102 may improve viewing experience by automatic pause of the playback in case the first user 108 may view or respond to the incoming call or incoming text message, such that the playback may be resumed after responding to the incoming call or incoming text message without missing one or more scenes of the content 112A. Details of the control of the playback based on the trigger signal are described, for example, in FIG. 6.

Figure 2:
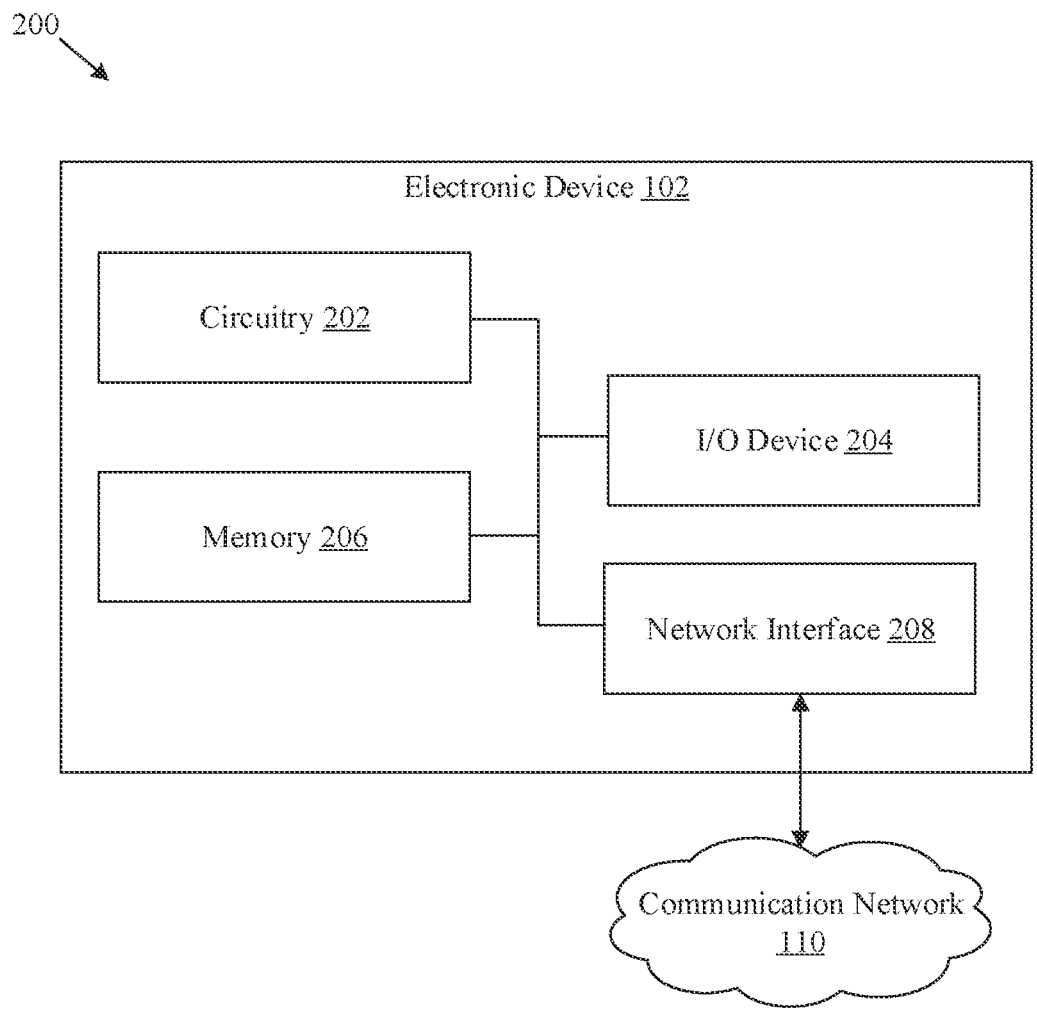
FIG. 2 is a block diagram that illustrates an exemplary electronic device for control of playback, in accordance with an embodiment of the disclosure.

FIG. 2 is a block diagram that illustrates an exemplary electronic device for control of playback, in accordance with an embodiment of the disclosure. FIG. 2 is explained in conjunction with elements from FIG. 1. With reference to FIG. 2, there is shown a block diagram 200 of an electronic device 102. The electronic device 102 may include circuitry 202, an Input/Output (I/O) device 204, a memory 206, and a network interface 208. The circuitry 202 may be communicatively coupled to the I/O device 204, the memory 206, and the network interface 208. The circuitry may communicate with the communication network 110 via the network interface 208.

The circuitry 202 may include suitable logic, circuitry, and interfaces that may be configured to execute program instructions associated with different operations to be executed by the electronic device 102. For example, some of the operations may include detection of a lip movement of the first user 108 and a posture of the first user 108 based on the one or more images of the first user 108 and/or the physical space 116, determination of whether the first user 108 is in a conversation based on the detected lip movement and the detected posture of the first user 108, and control of playback of the content 112A on the rendering device 112 based on the determination. The circuitry 202 may include one or more specialized processing units, which may be implemented as a separate processor. In an embodiment, the one or more specialized processing units may be implemented as an integrated processor or a cluster of processors that perform the functions of the one or more specialized processing units, collectively. The circuitry 202 may be implemented based on a number of processor technologies known in the art. Examples of implementations of the circuitry 202 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The I/O device 204 may include suitable logic, circuitry, and interfaces that may be configured to receive one or more user inputs (such as playback commands) through a remote control associated with the electronic device 102, and may render output (such as blinking LED lights) in response to the received user inputs. In an embodiment, the I/O device 204 may include one or more playback control buttons and an integrated display screen. In another embodiment, the I/O device 204 may generate a graphical user interface for display, and may receive user inputs via the graphical user interface. In case the electronic device 102 (such as a smart television) includes an integrated display screen, the electronic device 102 may cause the graphical user interface to be displayed on the integrated display screen. In case the electronic device 102 (such as a digital media player or a personal video recorder) is connected to an external rendering device (such as the rendering device 112), the electronic device 102 may cause the graphical user interface to be displayed on the rendering device 112 (such as a display screen). For example, the graphical user interface may include a plurality of menu icons related to the playback control of the content 112A. The graphical user interface may further include a plurality of icons that may be navigated for selection of the content 112A to be played on the rendering device 112 (such as the display screen). The I/O device 204, which may include various input and output devices, may be configured to communicate with the circuitry 202. Examples of such input and output devices may include, but are not limited to, a touchscreen, a keyboard, a mouse, a joystick, a microphone, an image sensor, a display device, a speaker, and/or a vibration actuator.

The memory 206 may include suitable logic, circuitry, and interfaces that may be configured to store the one or more instructions to be executed by the circuitry 202. In an example, the memory 206 may be configured to store the content 112A (such as media content). In another example, the memory 206 may be configured to store predefined lip movements indicative of conversation for comparison with the detected lip movement of the first user 108. The memory 206 may be configured to store predefined postures (such as nodding gesture, hand gesture, change in gaze towards another user, holding a user device close to the head, gazing at the user device, etc.) indicative of conversation for comparison with the detected posture of the first user 108. The memory 206 may be further configured to store the information related to a history of viewing pattern of the first user 108. For example, the circuitry 202 may receive the history of viewing pattern of the first user 108 from the server 114 and may store the history of viewing pattern in the memory 206. In an embodiment, the memory 206 may be configured to store settling time information related to a time required by the first user 108 or other users to settle down subsequent to entry of the first user 108 or other users into the physical space 116. Examples of implementation of the memory 206 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The network interface 208 may include suitable logic, circuitry, and interfaces that may be configured to facilitate communication between the electronic device 102, the server 114, the imaging apparatus 104, and the sensor 106. The electronic device 102 may receive the content 112A (such as streaming media content) from the server 114 (such as a media server) via the network interface 208. The network interface 208 may further facilitate communication between the circuitry 202, imaging apparatus 104, and the sensor 106. The electronic device 102 may further receive one or more images of the first user 108 and/or the physical space 116 from the imaging apparatus 104 via the network interface 208. The electronic device 102 may further receive one or more output signals from the sensor 106 via the network interface 208. The network interface 208 may further include an infrared (IR) receiver or a Bluetooth™ transceiver to receive commands (such as playback commands, navigation commands, volume control commands, etc.) from a remote control associated with the electronic device 102. The commands from the remote control may be based on a press of a corresponding button on the remote control or based on speech input. The network interface 208 may be implemented by use of various known technologies to support wired or wireless communication of the electronic device 102 with the communication network 110. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, a radio-frequency identification (RFID) tag, a Bluetooth™ transceiver, or a local buffer circuitry. The network interface 208 may be configured to communicate via wireless communication with networks, such as the Internet, an Intranet or a wireless network, such as a cellular telephone network, a wireless local area network (LAN), a metropolitan area network (MAN), and a satellite communication network (such as a satellite constellation). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth®, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

Although FIG. 2 illustrates the electronic device 102 includes the circuitry 202, the I/O device 204, the memory 206, and the network interface 208, the disclosure may not be limited in this regard. Accordingly, the electronic device 102 may include more or less components to perform the same or other functions of the electronic device 102. Details of the other functions and the components have been omitted from the disclosure for the sake of brevity. The functions or operations executed by the electronic device 102, as described in FIG. 1, may be performed by the circuitry 202. Operations executed by the circuitry 202 are described in detail, for example, in FIGS. 3-9.

Figure 3:
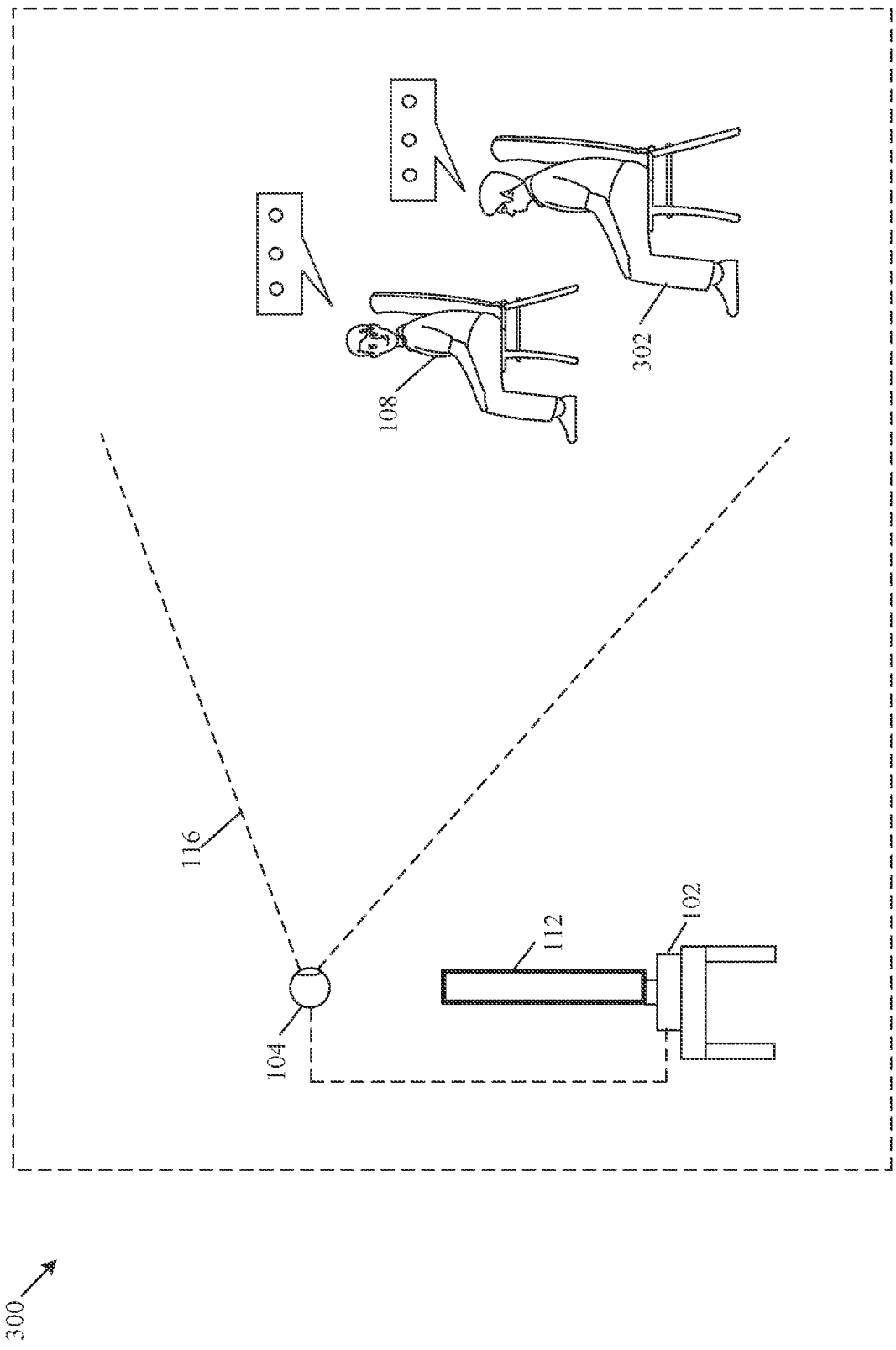
FIG. 3 illustrates an exemplary scenario for control of playback based on a lip movement and/or a posture of a first user, in accordance with an embodiment of the disclosure.
Figure 4:
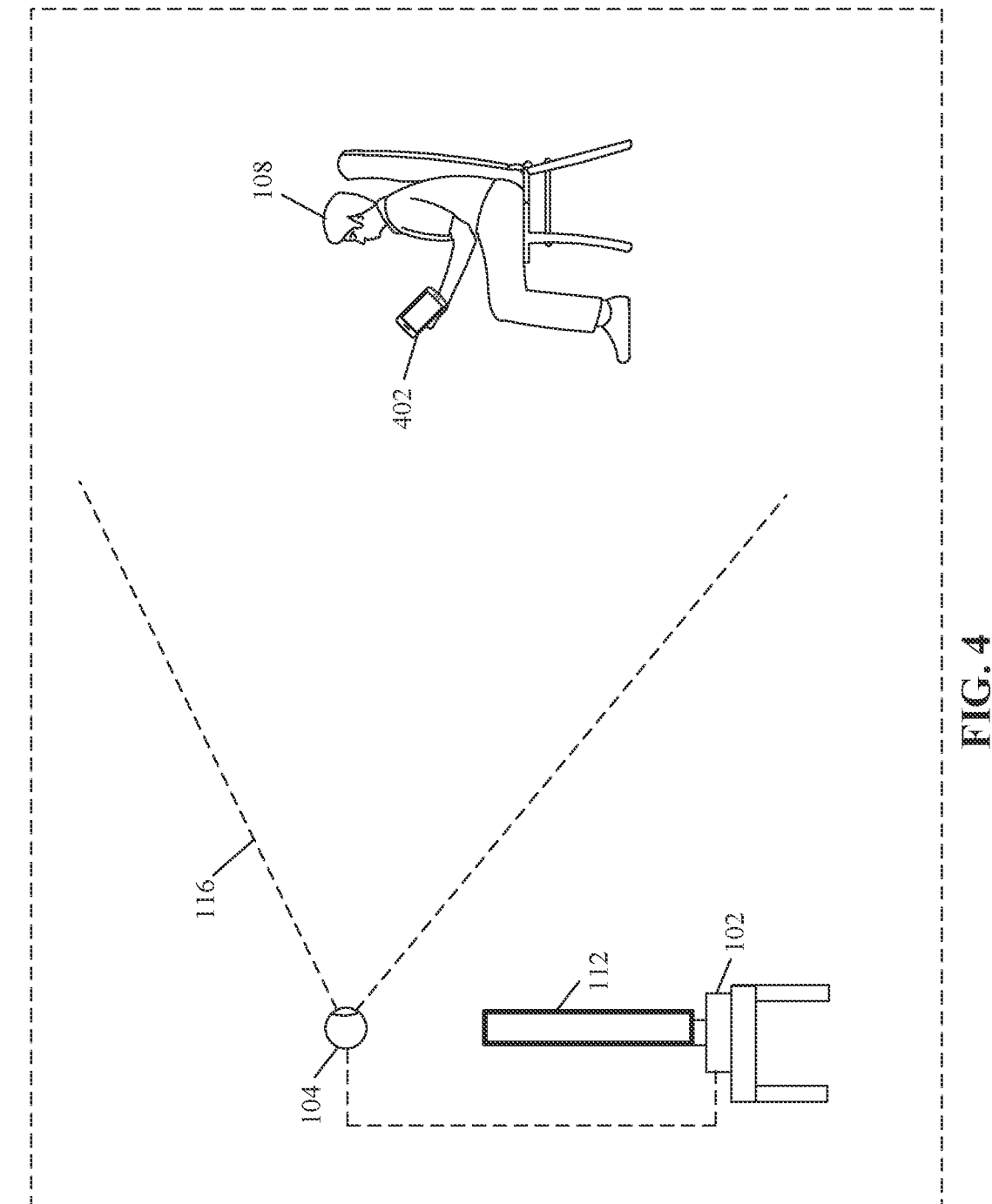
FIG. 4 illustrates an exemplary scenario for control of playback based on a posture of a first user, in accordance with an embodiment of the disclosure.

FIG. 3 illustrates an exemplary scenario for control of playback based on a lip movement and/or a posture of a first user, in accordance with an embodiment of the disclosure. FIG. 3 is explained in conjunction with elements from FIGS. 1 and 2. With reference to FIG. 3, there is shown an exemplary scenario 300. In the exemplary scenario 300, there is shown the electronic device 102 that may control the playback of the content 112A (such as media content) on the rendering device 112 (such as a display screen). In the exemplary scenario 300, there is further shown the imaging apparatus 104 that may capture one or more images of the first user 108 (such as a viewer of the display screen) and/or the physical space 116. In the exemplary scenario 300, the imaging apparatus 104 may capture one or more images of a second user 302 (such as another viewer of the display screen) who may be present in the physical space 116.

In accordance with another embodiment, the imaging apparatus 104 may capture one or more images of the first user 108 and the physical space 116. The imaging apparatus 104 may capture the one or more images of the first user 108 and the physical space 116 continuously or at periodic intervals (such as every few seconds). In accordance with another embodiment, the imaging apparatus 104 may capture a moving image (such as a video) of the first user 108 and the physical space 116. The imaging apparatus 104 may transmit the captured one or more images of the first user 108 and the physical space 116 to the electronic device 102.

In accordance with another embodiment, the circuitry 202 may be configured to acquire the one of more images (such as facial images) of the first user 108 and the physical space 116 from the imaging apparatus 104. The circuitry 202 may acquire the one or more images of the first user 108 and the physical space 116 via the communication network 110. The circuitry 202 may be configured to detect the lip movement of the first user 108 and the posture of the first user 108 based on the acquired one or more images of the first user 108 and the physical space 116. The circuitry 202 may be configured to detect the second user 302 in the physical space 116.

The circuitry 202 may be configured to determine whether the first user 108 is in a conversation with the second user 302 based on the lip movement of the first user 108. For example, the circuitry 202 may compare the detected lip movement of the first user 108 with predefined lip movements indicative of speech. The circuitry 202 may determine whether the first user 108 is in a conversation with the second user 302 based on the comparison. The circuitry 202 may be configured to determine whether the first user 108 is in the conversation with the second user 302 based on the posture of the first user 108. For example, the circuitry 202 may compare the detected posture of the first user 108 with predefined postures. The circuitry 202 may determine whether the first user 108 is in a conversation with the second user 302 based on the comparison. For example, the detected posture may indicate that the first user 108 may periodically turn the head or change the gaze towards the second user 302. In another example, the detected posture may indicate that the first user 108 may make a nodding gesture at the second user 302 or a hand gesture indicative of conversation. The circuitry 202 may compare the detected posture with predefined postures (such as change in gaze, or nodding gesture) to determine the first user 108 is in a conversation with the second user 302.

The circuitry 202 may detect the posture of the first user 108 in addition to the lip movement of the first user 108 to reduce false positives related to the detection of the conversation. For example, the circuitry 202 may detect the lip movement of the first user 108 in case the first user 108 may consume food or in case the first user 108 may sing along a sound track being played on the rendering device 112. The circuitry 202 may determine that the detected posture of the first user 108 may not indicate that the first user 108 is in a conversation. For example, the detected posture may indicate that hand of the first user 108 repeatedly moves towards the mouth of the first user 108, which may be indicative of consumption of food. In another example, the detected posture may indicate that the first user 108 may pay attention to the rendering device 112 (such as the display screen) based on a gaze of the first user 108. Accordingly, the circuitry 202 may determine that the first user 108 is not in a conversation, though the circuitry 202 may have detected the lip movement of the first user 108. In case the circuitry 202 may determine that the first user 108 is in a conversation with the second user 302, the circuitry 202 may control the rendering device 112 to pause the playback of the content 112A. On the other hand, in case the circuitry 202 may determine that the first user 108 is not in a conversation with the second user 302, the circuitry 202 may control the rendering device 112 to continue the playback of the content 112A. In accordance with another embodiment, the circuitry 202 may be configured to detect the lip movement and the posture of the second user 302 in addition to the first user 108 to reduce false positives. The circuitry 202 may determine whether the first user 108 is in a conversation with the second user 302 based on the detected lip movement and the posture of the second user 302.

In accordance with another embodiment, the circuitry 202 may be configured to determine an end of the conversation of the first user 108 based on the detected lip movement of the first user 108 and/or the detected posture of the first user 108 at a subsequent time instant. For example, the circuitry 202 may detect that the lip movement of the first user 108 has stopped at a subsequent time instant. The circuitry 202 may further determine that the detected posture of the first user 108 at a subsequent time instant indicates that the first user 108 is gazing back at the rendering device 112 (such as the display device). The circuitry 202 may be configured to control the rendering device 112 to resume the playback of the content 112A based on the determination of the end of the conversation of the first user 108.

In accordance with another embodiment, the circuitry 202 may resume the playback of the content 112A after a specific time (for example, settling time of few seconds) from the determined end of the conversation of the first user 108. The settling time may allow the first user 108 to settle down or regain focus back on the content 112A before the playback of the content 112A is resumed. In accordance with another embodiment, the circuitry 202 may resume the playback immediately after the determined end of the conversation of the first user 108. In an embodiment, the settling time may be preset by the manufacturer of the electronic device 102. In another embodiment, the circuitry 202 may set the settling time based on user input, and may range from 0 seconds to 10 seconds. The circuitry 202 may also utilize the settling time for control of the playback based on entry of the first user 108 into the physical space 116 subsequent to the exit from the physical space 116, as described, for example in FIGS. 5 and 8.

In accordance with another embodiment, the circuitry 202 may recognize that the second user 302 may be an infant in the physical space 116 based on the one or more images of the second user 302 or the physical space 116 and based on the object identification data stored in the memory 206 (shown in FIG. 2). In another embodiment, the circuitry 202 may detect an infant bed, an infant playpen, or an infant carrier based on the one or more images of the physical space 116, and may detect the presence of the infant. Based on the detection of the infant in the physical space 116, the circuitry 202 may receive audio information of the second user 302 from the sensor 106 (such as the audio sensor). The sensor 106 may detect the audio information from the second user 302 and transmit the audio information to the electronic device 102. The circuitry 202 may determine that the infant may be crying based on one or more sounds in the audio information. The circuitry 202 may control the rendering device 112 to pause the playback of the content 112A based on the audio information of the second user 302 (such as the infant).

In accordance with another embodiment, the circuitry 202 may be configured to determine a state of the first user 108 based on the detected posture of the first user 108. The circuitry 202 may be configured to compare the detected posture of the first user 108 with the predefined postures to determine the state of the first user 108. The circuitry 202 may be further configured to control a volume of the content 112A or the playback of the content 112A based on the determined state of the first user 108. For example, in case the posture (for example, drooping eyes) of the first user 108 indicates that the first user 108 is feeling drowsy, the circuitry 202 may reduce the volume of the content 112A or may stop the playback of the content 112A. In another example, in case the posture (for example, closed eyes) of the first user 108 indicates that the first user 108 is asleep or resting the eyes, the circuitry 202 may stop the playback of the content 112A. In another example, in case the posture (for example, frequently gazing away from the rendering device 112) of the first user 108 indicates that the first user 108 is not paying attention to the content 112A on the rendering device 112 (such as the display screen), the circuitry 202 may switch the content 112A on the rendering device 112 or may stop the playback of the content 112A.

FIG. 4 illustrates an exemplary scenario for control of playback based on a posture of a first user, in accordance with an embodiment of the disclosure. FIG. 4 is explained in conjunction with elements from FIGS. 1, 2, and 3. With reference to FIG. 4, there is shown an exemplary scenario 400. In the exemplary scenario 400, there is shown the electronic device 102 that may control the playback of the content 112A (such as media content) on the rendering device 112 (such as a display screen). In the exemplary scenario 400, there is further shown the imaging apparatus 104 that may capture one or more images of the first user 108 (such as a viewer of the display screen) and/or the physical space 116. In the exemplary scenario 400, there is further shown a user device 402 associated with the first user 108. Examples of the user device 402 may include, but are not limited to, a smartphone, a cellular phone, a mobile phone, a tablet computer, a smart watch, a smart wearable apparatus, and/or a consumer electronic (CE) device that may be capable of audio/video communication and instant messaging.

In according with an embodiment, the imaging apparatus 104 may capture the one or more images of the first user 108 and the physical space 116. For example, the captured one or more images may include an image of the first user 108 holding the user device 402 or gazing at the user device 402. The imaging apparatus 104 may transmit the captured one or more images of the first user 108 and the physical space 116 to the electronic device 102. The circuitry 202 may be configured to detect the lip movement of the first user 108 and/or the posture of the first user 108 based on the acquired one or more images of the first user 108 and the physical space 116. The circuitry 202 may compare the detected lip movement of the first user 108 with the predefined lip movements, and may compare the detected posture of the first user 108 with the predefined postures. The circuitry 202 may determine that the first user is in the conversation on the user device 402, based on the comparison. For example, the circuitry 202 may recognize that the detected posture (such as holding the user device 402 close to the head or gazing at the user device 402) of the first user 108 is indicative of the first user 108 being in a conversation on the user device 402. The circuitry 202 may detect the posture in addition to the lip movement to reduce false positives related to the detection of the conversation. Based on the detection of the conversation on the user device 402, the circuitry 202 may pause the playback of the content 112A on the rendering device 112. The circuitry 202 may resume playback of the content 112A based on detection of the end of the conversation on the user device 402 at a subsequent time instant. For example, the circuitry 202 may detect that the lip movement of the first user 108 has stopped, and may determine the end of the conversation on the user device 402. In another example, the circuitry 202 may detect the posture of the first user 108 that may be indicative of the first user 108 gazing back at the rendering device 112, and may determine the end of the conversation on the user device 402. In an embodiment, the circuitry 202 may resume the playback of the content 112A after a specific time (for example, settling time of few seconds) from the determined end of the conversation on the user device 402.

Figure 5:
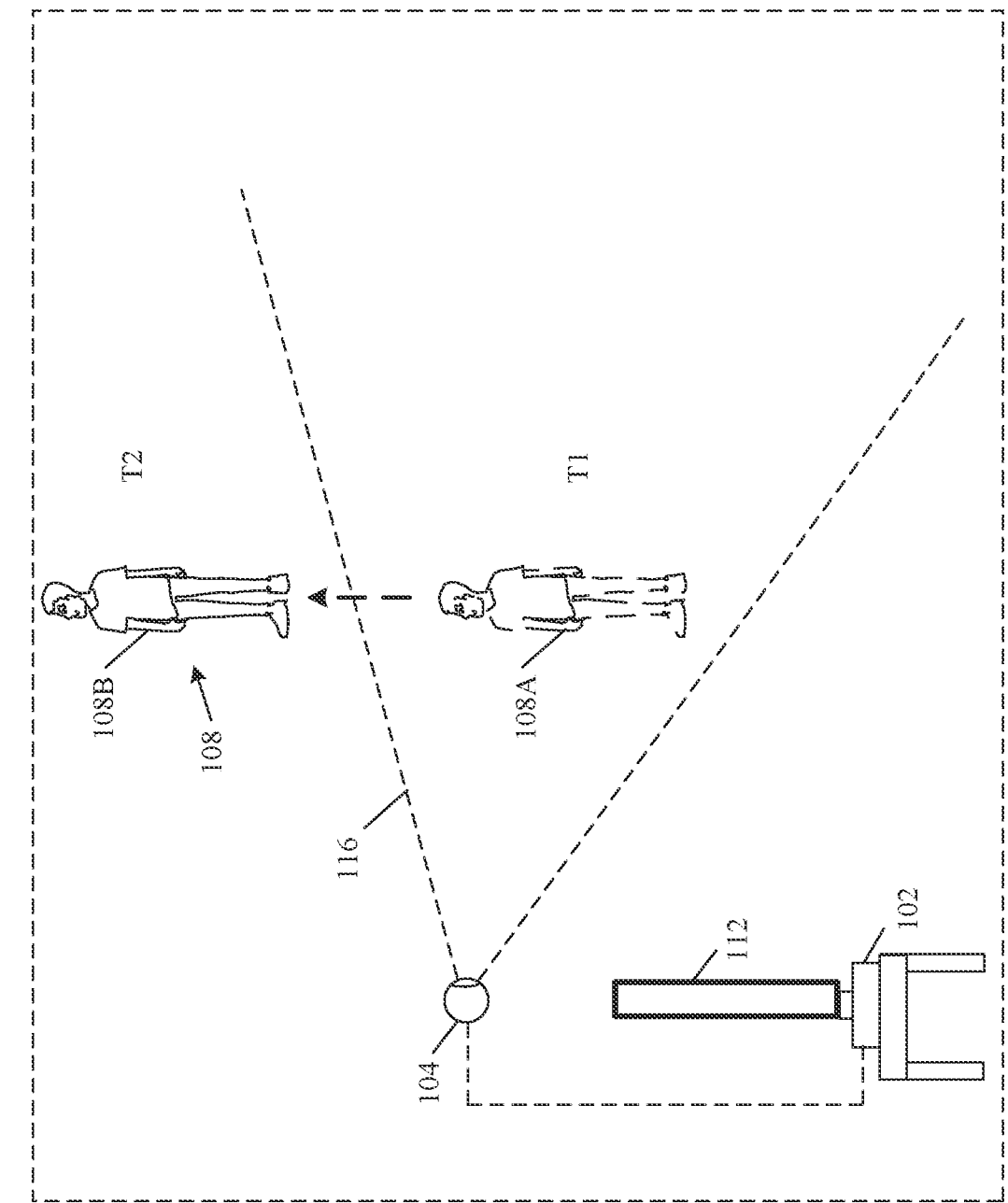
FIG. 5 illustrates an exemplary scenario for control of playback based on detection of a movement of a first user, in accordance with an embodiment of the disclosure.

FIG. 5 illustrates an exemplary scenario for control of playback based on detection of a movement of a first user, in accordance with an embodiment of the disclosure. FIG. 5 is explained in conjunction with elements from FIGS. 1-4. With reference to FIG. 5, there is shown an exemplary scenario 500. In the exemplary scenario 500, there is shown the electronic device 102 that may control the playback of the content 112A (such as media content) on the rendering device 112 (such as a display screen). In the exemplary scenario 500, there is further shown the imaging apparatus 104 that may capture one or more images of the first user 108 (such as a viewer of the display screen) and/or the physical space 116. As shown in FIG. 5, a first position of the first user 108 at a first time instant T1 may be at a position 108A within the physical space 116, and a second position of the first user 108 at a second time instant T2 may be at a position 108B outside the physical space 116.

In accordance with an embodiment, the imaging apparatus 104 may capture one or more images of the physical space 116 at the first time instant T1. The one or more images at the first time instant T1 may indicate that the first user 108 is inside the physical space 116 (such as the living room or the media room). The circuitry 202 may continue playback of the content 112A on the rendering device 112 at the first time instant T1 based on the captured one or more images. At the second time instant T2, the imaging apparatus 104 may capture one or more images of the first user 108 exiting the physical space 116. For example, the one or more images may include an image of the first user 108 who may exit the physical space 116 at the second time instant T2.

In an embodiment, the circuitry 202 may be configured to detect movement of the first user 108 in the physical space 116 based on the one or more images from the imaging apparatus 104. In another embodiment, the circuitry 202 may be configured to detect movement of the first user 108 based on the output of the sensor 106 (such as the load sensor or the IR sensor). The circuitry 202 may be further configured to compare the movement of the first user 108 with a threshold. The circuitry 202 may pause the playback of the content 112A on the rendering device 112 in case the movement of the first user 108 exceeds the threshold. For example, the threshold may be based on an amount of movement that corresponds to a person raising from a chair or taking a few steps from the chair. The threshold may be set by the manufacturer of the electronic device 102, and may be adjustable based on user input.

In accordance with another embodiment, the circuitry 202 may be configured to detect an exit of the first user 108 from the physical space 116 based on the one or more images from the imaging apparatus 104 and based on the movement of the first user 108. For example, the circuitry 202 may be configured to detect the exit of the first user 108 from the physical space 116 at the second time instant T2. In an embodiment, the circuitry 202 may be configured to detect the exit of the first user 108 from the physical space 116 based on the absence of the first user 108 in the one or more images from the imaging apparatus 104. In another embodiment, the circuitry 202 may be configured to detect the exit of the first user 108 from the physical space 116 based on a direction of the movement of the first user 108 prior to the exit of the first user 108 from the physical space 116. For example, the circuitry 202 may be configured to predict that the first user 108 may exit the physical space 116 based on the movement of the first user 108 that exceeds the threshold. In another example, the circuitry 202 may be configured to predict that the first user 108 may exit the physical space 116 based on detection that the first user 108 is at the edge of the field of view of the imaging apparatus 104. The circuitry 202 may be configured to pause the playback of the content 112A on the rendering device 112 based on the determination of the exit of the first user 108 from the physical space 116.

In an embodiment, the circuitry 202 may detect entry of the first user 108 into the physical space 116 at a subsequent time instant based on the one or more images from the imaging apparatus 104. The circuitry 202 may resume the playback of the content 112A on the rendering device 112 based on the detection of the entry of the first user 108 into the physical space 116. The circuitry 202 may resume the playback of the content 112A after a specific time (such as the settling time) from the time of the detection of the first user 108 in the physical space 116. The settling time of a few seconds may allow the first user 108 to settle down before the playback of the content 112A is resumed. In another embodiment, the circuitry 202 may resume the playback immediately after the detection of the first user 108 in the physical space 116. In an embodiment, the settling time may be preset by the manufacturer of the electronic device 102. In another embodiment, the circuitry 202 may set the settling time based on user input, and may range from 0 seconds to 10 seconds. The circuitry 202 may thereby improve playback control by automatic pause and resume of the playback in case the first user 108 may exit the physical space 116, for example, to take a break during the playback of the content 112A. Although FIG. 5 illustrates a single viewer (such as the first user 108), it may be noted that the single user is illustrated for the purposes of description only, and there may be other viewers present in the physical space 116, without departing from the scope of the present disclosure.

FIG. 6 illustrates an exemplary scenario for control of playback based on detection of a second user in a physical space associated with a first user, in accordance with an embodiment of the disclosure. FIG. 6 is explained in conjunction with elements from FIGS. 1-5. With reference to FIG. 6, there is shown an exemplary scenario 600. In the exemplary scenario 600, there is shown the electronic device 102 that may control the playback of the content 112A (such as media content) on the rendering device 112. In the exemplary scenario 600, there is further shown the imaging apparatus 104 that may capture one or more images of the first user 108 (such as a viewer of the rendering device 112) and/or the physical space 116. In the exemplary scenario 600, the imaging apparatus 104 may further capture one or more images of a second user 602 who may be enter the physical space 116. As shown in FIG. 6, a first position of the second user 602 at a first time instant T1 may be at a position 602A outside the physical space 116, and a second position of the second user 602 at a second time instant T2 may be at a position 602B inside the physical space 116.

In accordance with an embodiment, the imaging apparatus 104 may capture one or more images of the physical space 116 at the first time instant T1. The circuitry 202 may continue playback of the content 112A on the rendering device 112 at the first time instant T1 based on the captured one or more images. At the second time instant T2, the imaging apparatus 104 may capture one or more images of the second user 602 in the physical space 116. For example, the one or more images may include an image of the second user 602 who may enter the physical space 116 at the second time instant T2.

The circuitry 202 may be configured to detect presence of the second user 602 in the physical space 116 based on the one or more images from the imaging apparatus 104. The circuitry 202 may be configured to control the playback of the content 112A on the rendering device 112 based on the detection of the second user 602 in the physical space 116. In one scenario, the circuitry 202 may resume the playback of the content 112A based on the detection of the second user 602 (such as another viewer) in the physical space 116, in case the content 112A is already paused at the time of the detection of the second user 602. The content 112A may be paused at a prior time instant based on detection of exit of the second user 602 from the physical space 116 at the prior time instant. Details of the pause of the content 112A based on exit from the physical space 116 are described, for example, in FIG. 5. The circuitry 202 may resume the playback of the content 112A after a specific time (such as the settling time) from the time of detection of the second user 602 in the physical space 116. The settling time of a few seconds may allow the second user 602 to settle down before the playback of the content 112A is resumed. The circuitry 202 may thereby provide an improved playback control by automatic pause of the playback of the content 112A on the rendering device 112, every time a viewer (such as the first user 108 or the second user 602) exits the physical space 116 (such as the living room or the media room), as described, for example, in FIG. 5. The circuitry 202 may further improve viewing experience by automatic resume of the playback of the content 112A on the rendering device 112, in case the viewer (such as the first user 108 or the second user 602) returns to the physical space 116 (such as the living room or the media room), as described, for example, in FIG. 6.

In another scenario, the circuitry 202 may pause the playback of the content 112A based on the detection of the second user 602, in case the content 112A is already playing at the time of the detection of the second user 602. The circuitry 202 may thereby improve viewing experience of the first user 108 by automatic pause of the playback of the content 112A on the rendering device 112, such that the first user 108 may not miss any scenes of the content 112A when interrupted by the second user 602. In some scenarios, the circuitry 202 may continue the playback of the content 112A without pause based on the detection of the second user 602, in case the content 112A is already playing at the time of the detection of the second user 602. In accordance with another embodiment, the circuitry 202 may be configured to detect a lip movement of the second user 602 subsequent to the detection of the second user 602 in the physical space 116. The circuitry 202 may detect the lip movement of the second user 602 based on the one or more images of the second user 602 from the imaging apparatus 104. The circuitry 202 may pause the playback of the content 112A based on the detection of the lip movement of the second user 602. In the exemplary scenario 600, the circuitry 202 may pause the playback of the content 112A in case the lip movement of the second user 602 is detected subsequent to the detection of the second user 602 in the physical space 116.

Figure 7:
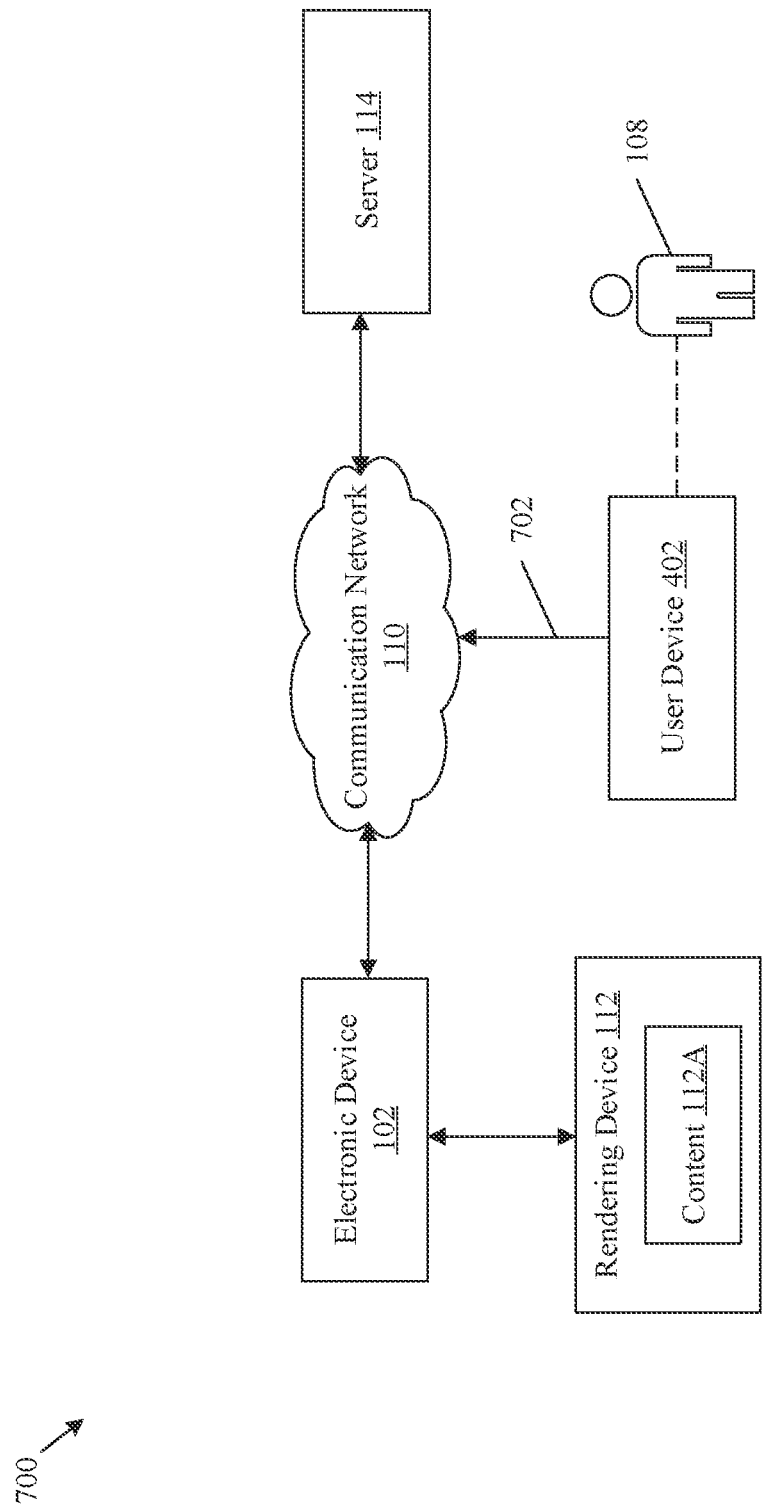
FIG. 7 is a block diagram that illustrates an exemplary scenario for control of playback, based on a trigger signal from a user device, in accordance with an embodiment of the disclosure.

FIG. 7 is a block diagram that illustrates an exemplary scenario for control of playback, based on a trigger signal from a user device, in accordance with an embodiment of the disclosure. FIG. 7 is explained in conjunction with elements from FIGS. 1-6. With reference to FIG. 7, there is shown an exemplary network environment 700 that includes the electronic device 102, the rendering device 112 (such as a display screen or an audio speaker), the communication network 110, server 114, and a user device 402. The user device 402 may be communicatively coupled to the electronic device 102 through the communication network 110. The user device 402 may be associated with the first user 108. Examples of the user device 402 may include, but are not limited to, a smartphone, a cellular phone, a mobile phone, a tablet computer, a smart watch, a smart wearable apparatus, and/or a consumer electronic (CE) device that may be capable of audio/video communication and instant messaging.

The circuitry 202 may be configured to receive a trigger signal 702 from the user device 402 in case the user device 402 generates an incoming notification based on an incoming communication signal. The circuitry 202 may receive the trigger signal 702 from the user device 402 via the communication network 110. In an embodiment, the user device 402 may be paired with the electronic device 102 based on user input. The settings of the user device 402 may be modified based on user input to permit the user device 402 to transmit the trigger signal 702 to the electronic device 102 in response to the incoming notification. The incoming notification may correspond to an incoming call, an incoming text message, or an incoming email at the user device 402.

In an exemplary scenario, the circuitry 202 may receive the trigger signal from the user device 402 based on the incoming notification at the user device 402 during the playback of the content 112A on the rendering device 112. The circuitry 202 may be configured to pause the playback of the content 112A on the rendering device 112 in response to the received trigger signal 702. For example, the circuitry 202 may pause the playback for a few seconds (such as 3-5 seconds), and further detect the posture of the first user 108, as described, for example in FIG. 4. In case the detected posture of the first user 108 indicates that the first user 108 continues to focus on the content being played on the rendering device 112, the circuitry 202 may resume playback of the content 112A on the rendering device 112. In case the detected posture (such as the user device 402 is held close to a head of the first user 108, or the user device 402 is held in a hand of the first user 108) of the first user 108 indicates that the first user 108 has responded to the incoming notification at the user device 402, the circuitry 202 may continue to pause the playback of the content 112A on the rendering device 112 until the first user 108 has stopped interaction with the user device 402. For example, the circuitry 202 may detect the posture of the first user 108 that may be indicative of the first user 108 gazing back at the rendering device 112, and may determine the end of the interaction with the user device 402. The circuitry 202 may then resume the playback of the content 112A on the rendering device 112. The circuitry 202 may thereby improve playback control by automatic pause of the playback of the content 112A based on the incoming call or incoming text message on the user device 402, such that the playback may be resumed after responding to the incoming call or incoming text message without missing one or more scenes of the content 112A.

Figure 8:
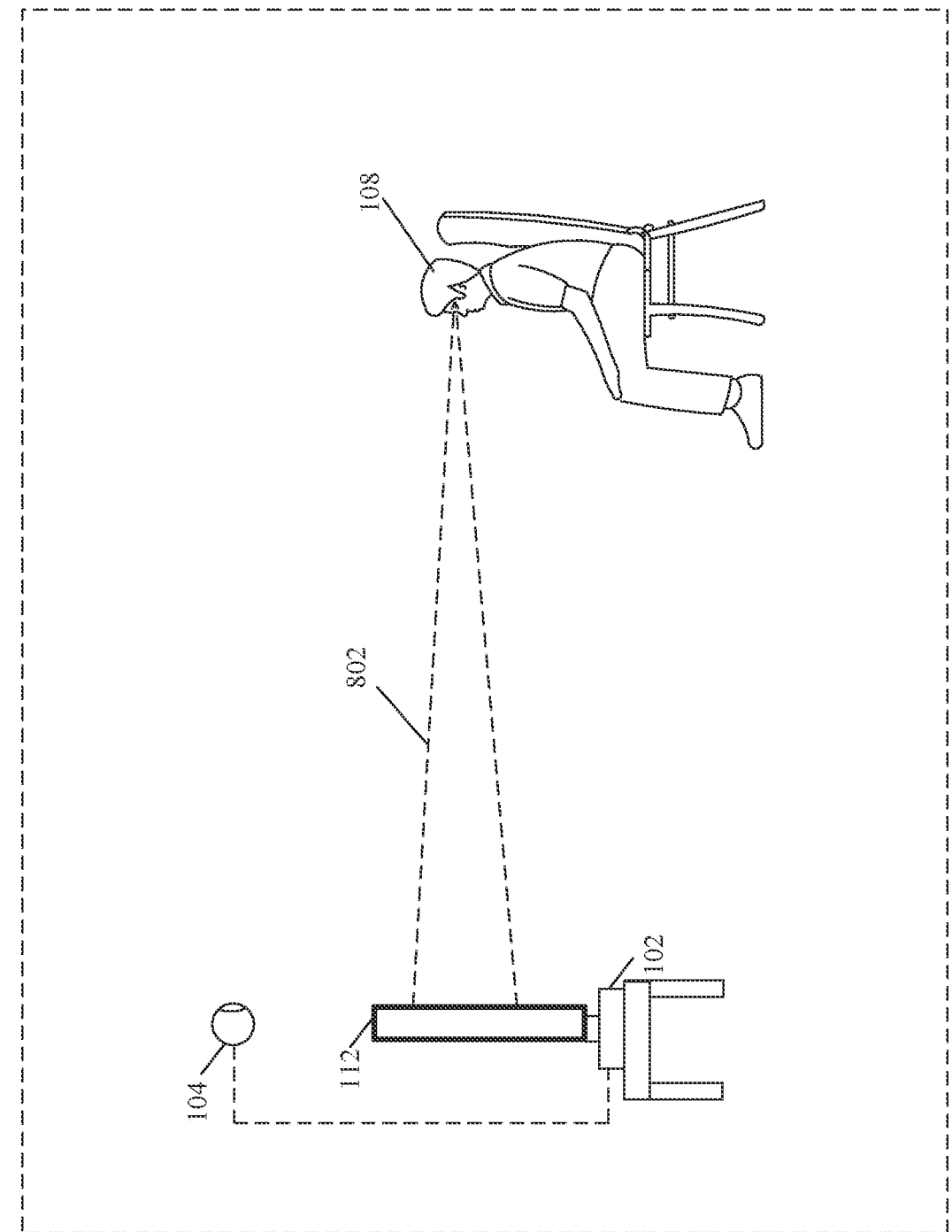
FIG. 8 illustrates an exemplary scenario for control of playback, based on a gaze of a first user, in accordance with an embodiment of the disclosure.

FIG. 8 illustrates an exemplary scenario for control of playback, based on a gaze of a first user, in accordance with an embodiment of the disclosure. FIG. 8 is explained in conjunction with elements from FIGS. 1-7. With reference to FIG. 8, there is shown an exemplary scenario 800. In the exemplary scenario 800, there is shown the electronic device 102 that may control the playback of the content 112A (such as media content) on the rendering device 112 (such as a display screen). In the exemplary scenario 800, there is further shown the imaging apparatus 104 that may capture one or more images of the first user 108 (such as a viewer of the display screen) and/or the physical space 116. In the exemplary scenario 800, the imaging apparatus 104 may further capture one or more images of the face of the first user 108.

The circuitry 202 may be configured to receive the one or more images of the face of the first user 108 from the imaging apparatus 104. In an embodiment, the circuitry 202 may be configured to detect a gaze 802 of the first user 108 based on the one or more images of the face of the first user 108. For example, the circuitry 202 may be configured to detect the gaze 802 of the first user 108 with respect to the position of the rendering device 112. The circuitry 202 may employ eye tracking methods to track eye motion from images of the eyes of the first user 108. In another embodiment, the circuitry 202 may be configured to detect an orientation of the head of the first user 108 based on the one or more images of the first user 108. For example, the circuitry 202 may be configured to detect the orientation of the head of the first user 108 with respect to the position of the rendering device 112. Based on the detected gaze 802 or the detected orientation of the head of the first user 108, the circuitry 202 may be configured to determine whether the first user 108 pays attention to the content 112A. The circuitry 202 may be configured to control the playback of the content 112A on the rendering device 112 (such as the display screen) based on the detection that the first user 108 pays attention to the content 112A.

In the exemplary scenario 800, the circuitry 202 may determine that the first user 108 is in a conversation on the user device 402, and may pause the playback of the content 112A, as described, for example, in FIG. 4. The circuitry 202 may then detect the gaze 802 or the orientation of the head of the first user 108 with respect to the rendering device 112 (such as the display screen), and may determine that the first user 108 continues to pay attention to the content 112A on the rendering device 112 (such as the display screen). The circuitry 202 may resume the playback of the content 112A even in the case where the first user 108 is detected to be in a conversation on the user device 402. This may allow the first user 108 to concurrently view the content 112A and converse with a caller on the user device 402, in a case where the first user 108 may wish to view the content 112A and converse with the caller while the content 112A is played on the rendering device 112.

In accordance with another embodiment, the circuitry 202 may be configured to identify the first user 108 based on the captured one or more images of the first user 108. For example, the circuitry 202 may extract a facial image of the first user 108 may from the one or more images of the first user 108. The circuitry 202 may compare extracted facial image with one or more user profiles stored in the memory 206 (shown in FIG. 2). The circuitry 202 may be configured to determine a viewing pattern associated with the identified first user 108 based on a user history (as shown in Table 1) associated with the first user 108. The circuitry 202 may be configured to pause or resume the playback of the content 112A on the rendering device 112 (such as the display screen) based on the determined viewing pattern.

Example of the user history of viewing pattern each associated with different users is presented in Table 1, as follows:

TABLE 1

User history of viewing pattern associated with each user.

| User Profile | User History of Viewing Pattern | Playback control |
| --- | --- | --- |
| First User 108 | Takes a break after every 30 minutes. Duration of break is 5 minutes | Pause playback of content after every 30 minutes. Resume playback of content after 5 minutes from pausing. |
| Second User 302 | Takes a break after every 45 minutes Duration of break is 10 minutes | Pause playback of content after every 45 minutes. Resume playback of content after 10 mins from pausing. |

With reference to Table 1, the memory 206 may store the user history of viewing pattern associated with each user in association with the user profile of the respective user. For example, in case the circuitry 202 may identify the viewer to be the first user 108, the circuitry 202 may be configured to determine that the first user 108 may take a break from viewing the rendering device 112 (such as the display screen) after every 30 mins and the duration of the break may be 5 mins. The circuitry 202 may be configured to automatically control the playback of the content 112A (such as a lengthy movie) to pause the playback of the movie after every 30 mins, and to resume the playback of the movie after 5 mins from pausing. Similarly, in case the circuitry 202 may identify the viewer to be the second user 302, the circuitry 202 may be configured to determine that the second user 302 may take a break from viewing the rendering device 112 (such as the display screen) after every 45 mins and the duration of the break may be 10 mins. The circuitry 202 may be configured to automatically control the playback of the content 112A (such as a lengthy movie) to pause the playback of the movie after every 45 mins, and to resume the playback of the movie after 10 mins from pausing. The circuitry 202 may thereby improve viewing experience by automatic control of the playback based on viewing habits of the first user 108 or the second user 302, and may encourage the first user 108 or the second user 302 to take a break based on their respective viewing patterns. In an embodiment, the control of the playback based on the viewing pattern may be enabled for lengthy content, and may be disabled based on user input.

Figure 9:
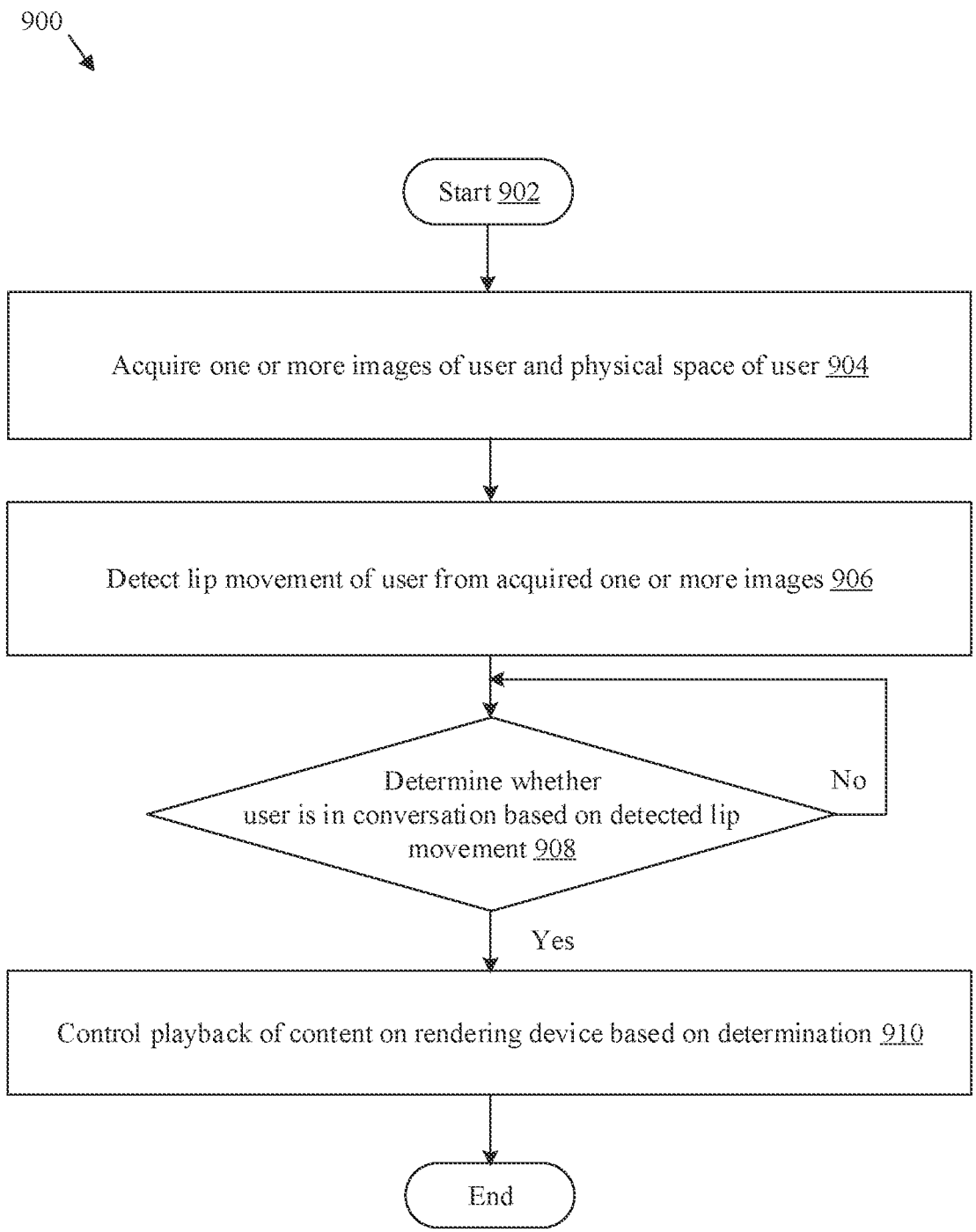
FIG. 9 is a flowchart that illustrates an exemplary method for control of playback, in accordance with an embodiment of the disclosure.

FIG. 9 is a flowchart that illustrates an exemplary method for control of playback, in accordance with an embodiment of the disclosure. FIG. 9 is explained in conjunction with elements from FIGS. 1-8. With reference to FIG. 9, there is shown a flowchart 900. The method illustrated in the flowchart 900 may be executed by any computing system, such as by the electronic device 102, or the circuitry 202. The method may start at 902 and proceed to 904.

At 904, one or more images of a first user (such as the first user 108) and a physical space (such as physical space 116) associated with the first user 108 may be acquired. In accordance with an embodiment, the circuitry 202 may be configured to acquire the one or more images of the first user 108 and the physical space 116 from an imaging apparatus 104 (such as the imaging apparatus 104). Details of the acquisition of the one or more images of the first user 108 and the physical space 116 are provided, for example, in FIG. 1.

At 906, a lip movement of the first user 108 may be detected based on the acquired one or more images. In accordance with an embodiment, the circuitry 202 may be configured to detect the lip movement of first user 108 from acquired one or more images. Details of the detection of the lip movement and the posture of the first user 108 are provided, for example, in FIGS. 3 and 4.

At 908, a determination whether the first user 108 is in a conversation may be made based on the lip movement of the first user 108. In accordance with an embodiment, the circuitry 202 may be configured to determine whether the first user 108 is in the conversation based on the detected lip movement of the first user 108. Based on the determination that the first user 108 may be in the conversation, the control may pass to 910. Details of the determination whether the first user 108 is in the conversation are provided, for example, in FIGS. 3 and 4.

At 910, the playback of content (such as the content 112A) on a rendering device (such as the rendering device 112) may be controlled based on the determination that the user is in the conversation. In accordance with an embodiment, the circuitry 202 may be configured to control the playback of the content 112A on the rendering device 112. Details of the detection of the control of the playback of the content 112A on the rendering device 112 are provided, for example, in FIGS. 3-8.

Although the flowchart 900 is illustrated as discrete operations, such as 902, 904, 906, 908 and 910, the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer-readable medium and/or storage medium having stored thereon, instructions executable by a machine and/or a computer to operate a system (such as the electronic device 102 or the circuitry 202). The instructions may cause the machine and/or computer to perform operations that may include acquiring, from the imaging apparatus 104, one or more images of the first user 108 and the physical space 116 of the first user 108. The operations may further include detecting the lip movement of the first user 108 based on the acquired one or more images. The operations may further include determining whether the first user 108 is in a conversation based on the detected lip movement of the first user 108. The operations may further include controlling playback of the content 112A on the rendering device 112 based on the determination.

Various embodiments of the disclosure may provide an electronic device (such as the electronic device 102) for control of playback based on image capture. The electronic device 102 may include circuitry (such as the circuitry 202) that is communicatively coupled to an imaging apparatus (such as the imaging apparatus 104) and a rendering device (such as the rendering device 112) that plays content (such as the content 112A). The circuitry 202 may be configured to acquire, from the imaging apparatus 104, one or more images of a first user (such as the first user 108) and a physical space (such as the physical space 116) associated with the first user 108. The circuitry 202 may be configured to detect a lip movement of the first user 108 based on the acquired one or more images. The circuitry 202 may be configured to determine whether the first user 108 is in a conversation based on the detected lip movement of the first user 108. The circuitry 202 may be configured to control playback of the content 112A on the rendering device 112 (such as a display screen or a speaker) based on the determination.

In accordance with an embodiment, the circuitry 202 may be configured to detect a lip movement of the first user 108 and a posture of the first user 108 based on the acquired one or more images. The circuitry 202 may be configured to determine that the first user 108 is in a conversation with a second user (such as the second user 302) based on the detected posture of the first user 108. The circuitry 202 may be configured to pause the playback of the content 112A on the rendering device 112 based on the determination that the first user 108 is in the conversation with the second user 302. The circuitry 202 may be configured to determine that the first user 108 is in the conversation on a user device (such as the user device 402), based on the detected posture of the first user 108. The circuitry 202 may be configured to pause the playback of the content 112A on the rendering device 112 based on the determination that the first user 108 is in the conversation on the user device 402.

In accordance with an embodiment, the circuitry 202 may be configured to determine an end of the conversation of the first user 108 based on the lip movement of the first user 108. The circuitry 202 may be configured to resume the playback of the content 112A on the rendering device 112 based on the end of the conversation of the first user 108. The circuitry 202 may be configured to resume the playback of the content 112A after a specific time (settling time) from the end of the conversation of the first user 108.

In accordance with an embodiment, the circuitry 202 may be configured to detect a second user (such as the second user 602) in the physical space 116 based on the acquired one or more images. The circuitry 202 may control the playback of the content 112A on the rendering device 112 based on the detected second user 602 after a specific time (such as the settling time) from the detection of the second user 602. The circuitry 202 may be configured to detect a lip movement of the second user 602 based on the acquired one or more images and pause the playback of the content 112A on the rendering device 112 based on the lip movement of the second user 602.

In accordance with an embodiment, the circuitry 202 may be configured to receive, from the user device 402, a trigger signal (such as the trigger signal 702) based on an incoming notification at the user device 402. In response to the trigger signal 702, the circuitry 202 may be configured to the posture of the first user 108. The detected posture may indicate that the user device is held close to a head of the first user, or that the user device is held in a hand of the first user The circuitry 202 may pause the playback of the content 112A on the rendering device 112 based on the detected posture. The incoming notification may correspond to at least one of an incoming call, an incoming text message, or an incoming email at the user device 402.

In accordance with an embodiment, the circuitry 202 may be configured to detect one of an infant, an infant bed, an infant playpen, or an infant carrier in the physical space 116 based on the acquired one or more images. The circuitry 202 may be configured to receive audio information associated with the infant, and may pause the playback of the content 112A on the rendering device 112 based on the audio information associated with the infant.

In accordance with an embodiment, the circuitry 202 may be configured to detect a gaze of the first user 108. The circuitry 202 may be configured to determine the first user 108 may pay attention to the content 112A on the rendering device 112 based on the detected gaze of the first user 108. The circuitry 202 may resume the playback of the content 112A on the rendering device 112 based on the determination the first user 108 may pay attention to the content 112A. The content 112A may be at least one of a recorded content or a streaming content.

In accordance with an embodiment, the circuitry 202 may be configured to identify the first user 108 based on the acquired one or more images. The circuitry 202 may be configured to determine a viewing pattern associated with the identified first user 108 based on a user history associated with the identified first user 108, and may pause or resume the playback of the content 112A on the rendering device 112 based on the determined viewing pattern.

In accordance with an embodiment, the circuitry 202 may be configured to determine a state of the first user 108 based on the detected posture of the first user 108. The circuitry 202 may control one of a volume of the content or the playback of the content 112A based on the state of the first user 108.

In accordance with an embodiment, the circuitry 202 may be configured to determine a movement of the first user 108 in the physical space 116 is larger than a threshold. The circuitry 202 may pause the playback of the content 112A on the rendering device 112 based on the determination that the movement of the first user 108 is larger than the threshold. The circuitry 202 may be configured to determine an exit of the first user 108 from the physical space 116. The circuitry 202 may pause the playback of the content 112A on the rendering device 112 based on the determined exit of the first user 108 from the physical space 116.

Various embodiments of the disclosure may provide an electronic device (such as the electronic device 102) for control of playback based on image capture. The electronic device 102 may include circuitry (such as the circuitry 202) that is communicatively coupled to an imaging apparatus (such as the imaging apparatus 104) and a rendering device (such as the rendering device 112) that plays content (such as the content 112A). The circuitry 202 may be configured to acquire, from the imaging apparatus 104, one or more images of a first user (such as the first user 108) and a physical space (such as the physical space 116) associated with the first user 108. The circuitry 202 may be configured to detect a lip movement of the first user 108 and a posture of the first user 108 based on the acquired one or more images. The circuitry 202 may be configured to determine whether the first user 108 is in a conversation based on the detected lip movement and the detected posture of the first user 108. The circuitry 202 may be configured to control playback of the content 112A on the rendering device 112 (such as a display screen or a speaker) based on the determination.

The foregoing description of embodiments and examples has been presented for purposes of illustration and description. It is not intended to be exhaustive or limiting to the forms described. Numerous modifications are possible considering the above teachings. Some of those modifications have been discussed and others will be understood by those skilled in the art. The embodiments were chosen and described for illustration of various embodiments. The scope is not limited to the examples or embodiments set forth herein but can be employed in any number of applications and equivalent devices by those of ordinary skill in the art. Rather it is hereby intended the scope be defined by the claims appended hereto. Additionally, the features of various implementing embodiments may be combined to form further embodiments.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form. While the present disclosure has been described with reference to certain embodiments, it will be understood by those skilled in the art that various changes may be made, and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments that fall within the scope of the appended claims.

What is claimed is:

1. An electronic device, comprising:
circuitry communicatively coupled to an imaging apparatus and a rendering device that plays content, wherein the circuitry is configured to:
acquire, from the imaging apparatus, one or more images of a first user of the electronic device and a physical space associated with the first user;
receive a user input that includes a settling time of the first user, wherein the settling time indicates a time required by the first user to settle after an entry into the physical space;
detect a lip movement of the first user based on the acquired one or more images;
determine whether the first user is in a conversation based on the detected lip movement of the first user;
control playback of the content on the rendering device based on the determination;
detect a movement of the first user;
compare the detected movement of the first user with a threshold movement, wherein the threshold movement is a specific amount of movement in the physical space;
pause the playback of the content on the rendering device based on a result of the comparison that the detected movement of the first user is larger than the threshold movement;
detect, based on the acquired one or more images, the entry of the first user into the physical space;
resume the playback of the content on the rendering device after the settling time elapses from the detection of the entry of the first user;
receive, from a user device, a trigger signal based on an incoming notification at the user device;
pause, in response to the trigger signal, the playback of the content on the rendering device for a specific period;
detect, in response to the trigger signal, a posture of the first user based on the acquired one or more images; and
determine, based on the detected posture, whether to resume or continue to pause after the specific period, the playback of the content on the rendering device.

2. The electronic device according to claim 1, wherein the circuitry is further configured to:
detect the posture of the first user based on the acquired one or more images;
determine that the first user is in the conversation with a second user in the physical space, based on the detected posture of the first user; and
pause the playback of the content on the rendering device based on the determination that the first user is in the conversation with the second user.

3. The electronic device according to claim 1, wherein the circuitry is further configured to:
detect the posture of the first user based on the acquired one or more images;
determine that the first user is in the conversation on the user device, based on the detected posture of the first user; and
pause the playback of the content on the rendering device based on the determination that the first user is in the conversation on the user device.

4. The electronic device according to claim 1, wherein the circuitry is further configured to:
determine an end of the conversation of the first user based on the lip movement of the first user; and
resume the playback of the content on the rendering device based on the end of the conversation of the first user.

5. The electronic device according to claim 4, wherein the circuitry is further configured to resume the playback of the content after a specific time from the end of the conversation of the first user.

6. The electronic device according to claim 1, wherein the circuitry is further configured to:
detect a second user in the physical space based on the acquired one or more images; and
control the playback of the content on the rendering device based on the detected second user after a specific time from the detection of the second user.

7. The electronic device according to claim 6, wherein the circuitry is further configured to:
detect the lip movement of the second user based on the acquired one or more images; and
pause the playback of the content on the rendering device based on the lip movement of the second user.

8. The electronic device according to claim 1, wherein the detected posture indicates one of:
the user device is held close to a head of the first user, or
the user device is held in a hand of the first user.

9. The electronic device according to claim 8, wherein the incoming notification corresponds to at least one of an incoming call, an incoming text message, or an incoming email on the user device.

10. The electronic device according to claim 1, wherein the circuitry is further configured to:
detect one of an infant, an infant bed, infant playpen, or an infant carrier in the physical space based on the acquired one or more images;
receive audio information associated with the infant; and
pause the playback of the content on the rendering device based on the audio information associated with the infant.

11. The electronic device according to claim 1, wherein the circuitry is further configured to:
detect a gaze of the first user;
determine the first user pays attention to the content on the rendering device based on the detected gaze of the first user; and
resume the playback of the content on the rendering device based on the determination the first user pays attention to the content.

12. The electronic device according to claim 1, wherein the content is at least one of a recorded content, a streaming content, an audio content, or a video content.

13. The electronic device according to claim 1, wherein the circuitry is further configured to:
identify the first user based on the acquired one or more images;
determine a viewing pattern associated with the identified first user based on a user history associated with the identified first user; and
pause or resume the playback of the content on the rendering device based on the determined viewing pattern.

14. The electronic device according to claim 1, wherein the circuitry is further configured to:
detect the posture of the first user based on the acquired one or more images;

determine a state of the first user based on the detected posture of the first user; and control one of a volume of the content or the playback of the content based on the state of the first user.

15. The electronic device according to claim 1, wherein the circuitry is further configured to:

determine an exit of the first user from the physical space; and pause the playback of the content on the rendering device based on the determined exit of the first user from the physical space.

16. An electronic device, comprising:

circuitry communicatively coupled to an imaging apparatus and a rendering device that plays content, wherein the circuitry is configured to:

acquire, from the imaging apparatus, one or more images of a first user of the electronic device and a physical space associated with the first user;

receive a user input that includes a settling time of the first user, wherein the settling time indicates a time required by the first user to settle after an entry into the physical space;

detect a lip movement of the first user and a posture of the first user based on the acquired one or more images;

determine whether the first user is in a conversation based on the detected lip movement and the detected posture of the first user;

control playback of the content on the rendering device based on the determination;

detect a movement of the first user;

compare the detected movement of the first user with a threshold movement, wherein the threshold movement is a specific amount of movement in the physical space;

pause the playback of the content on the rendering device based on a result of the comparison that the detected movement of the first user is larger than the threshold movement;

detect, based on the acquired one or more images, the entry of the first user into the physical space;

resume the playback of the content on the rendering device after the settling time elapses from the detection of the entry of the first user;

receive, from a user device, a trigger signal based on an incoming notification at the user device;

pause, in response to the trigger signal, the playback of the content on the rendering device for a specific period;

detect, in response to the trigger signal, a posture of the first user based on the acquired one or more images; and determine, based on the detected posture, whether to resume or continue to pause after the specific period, the playback of the content on the rendering device.

17. A method, comprising:

in an electronic device comprising circuitry communicatively coupled to an imaging apparatus and a rendering device that plays content:

acquiring, from the imaging apparatus, one or more images of a first user of the electronic device and a physical space associated with the first user;

receiving, by the circuitry, a user input that includes a settling time of the first user, wherein the settling time indicates a time required by the first user to settle after an entry into the physical space;

detecting, by the circuitry, a lip movement of the first user based on the acquired one or more images;

determining, by the circuitry, whether the first user is in a conversation based on the detected lip movement of the first user;

controlling, by the circuitry, playback of the content on the rendering device based on the determination;

detecting, by the circuitry, a movement of the first user;

comparing, by the circuitry, the detected movement of the first user with a threshold movement, wherein the threshold movement is a specific amount of movement in the physical space;

pausing, by the circuitry, the playback of the content on the rendering device based on a result of the comparison that the detected movement of the first user is larger than the threshold movement;

detecting, by the circuitry, based on the acquired one or more images, the entry of the first user into the physical space;

resuming, by the circuitry, the playback of the content on the rendering device after the settling time elapses from the detection of the entry of the first user;

receiving, by the circuitry, from a user device, a trigger signal based on an incoming notification at the user device;

pausing, by the circuitry, in response to the trigger signal, the playback of the content on the rendering device for a specific period;

detecting, by the circuitry, in response to the trigger signal, a posture of the first user based on the acquired one or more images; and determining, by the circuitry, based on the detected posture, whether to resume or continue to pause after the specific period, the playback of the content on the rendering device.

18. The method according to claim 17, further comprising:

detecting the posture of the first user based on the acquired one or more images;

determining that the first user is in the conversation with a second user in the physical space, based on the detected posture of the first user; and pausing the playback of the content on the rendering device based on the determination that the first user is in the conversation with the second user.

19. The method according to claim 17, further comprising:

detecting a second user in the physical space based on the acquired one or more images;

detecting a lip movement of the second user based on the acquired one or more images; and pausing the playback of the content on the rendering device based on the lip movement of the second user.

* * * * *